(12) United States Patent
Nimbalker et al.

(10) Patent No.: US 12,501,447 B2
(45) Date of Patent: *Dec. 16, 2025

(54) METHODS AND APPARATUSES FOR HANDLING CONFIGURED AND DYNAMIC DOWNLINK TRANSMISSIONS IN A WIRELESS COMMUNICATION NETWORK

(71) Applicant: Telefonaktiebolaget LM Ericsson (publ), Stockholm (SE)

(72) Inventors: Ajit Nimbalker, Dublin, CA (US); Ravikiran Nory, San José, CA (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 18/762,793

(22) Filed: Jul. 3, 2024

(65) Prior Publication Data
US 2024/0357610 A1 Oct. 24, 2024

Related U.S. Application Data

(63) Continuation of application No. 18/508,422, filed on Nov. 14, 2023, now Pat. No. 12,082,218, which is a
(Continued)

(51) Int. Cl.
*H04L 5/00* (2006.01)
*H04W 72/23* (2023.01)

(52) U.S. Cl.
CPC ........... *H04W 72/23* (2023.01); *H04L 5/0094* (2013.01)

(58) Field of Classification Search
CPC ... H04L 5/0042; H04L 5/0044; H04L 5/0053; H04L 5/0078; H04W 72/23
See application file for complete search history.

(56) References Cited

U.S. PATENT DOCUMENTS

2015/0043458 A1* 2/2015 Seo ................. H04W 72/21
370/329
2019/0007117 A1 1/2019 Kim et al.
(Continued)

FOREIGN PATENT DOCUMENTS

CN 104737479 A 6/2015
CN 104904299 A 9/2015
(Continued)

OTHER PUBLICATIONS

"3rd Generation Partnership Project; Technical Specification Group Radio Access Network; NR; Physical layer procedures for control (Release 15)", 3GPP TS 38.213 V15.3.0, Sep. 2018, 101 pages.
(Continued)

*Primary Examiner* — Andrew Lee
(74) *Attorney, Agent, or Firm* — Murphy, Bilak & Homiller, PLLC

(57) ABSTRACT

Techniques disclosed herein efficiently address prioritization by a UE regarding its reception behavior with respect to a configured downlink transmission that is overlapped by a dynamic assignment and/or the dynamic downlink transmission scheduled via the dynamic assignment. In at least one embodiment having applicability to operation of the UE in a communication network based on the 5G NR specifications, the techniques disclosed herein provide for predictable behavior by the UE as to when the UE prioritizes a configured Physical Downlink Shared Channel (PDSCH) versus another PDSCH. Correspondingly, a radio network node may exploit the predictable behavior of the UE to override a configured PDSCH in favor of a dynamic PDSCH, by transmitting the Physical Downlink Control Channel (PDCCH) that schedules the dynamic PDSCH so that a timing relationship between the PDCCH and the configured PDSCH is satisfied.

6 Claims, 12 Drawing Sheets

Related U.S. Application Data continuation of application No. 17/767,077, filed as application No. PCT/SE2020/050960 on Oct. 8, 2020, now abandoned.

(60) Provisional application No. 62/914,268, filed on Oct. 11, 2019.

(56) References Cited

U.S. PATENT DOCUMENTS

| | | |
|---|---|---|
| 2019/0208519 A1 | 7/2019 | Parkvall et al. |
| 2019/0229878 A1* | 7/2019 | Takeda ................ H04W 72/02 |
| 2019/0254045 A1 | 8/2019 | Sadiq et al. |
| 2019/0289622 A1 | 9/2019 | Chatterjee et al. |
| 2020/0092860 A1 | 3/2020 | Khoshnevisan et al. |
| 2020/0267597 A1* | 8/2020 | Huang ................ H04L 1/1812 |
| 2020/0296757 A1* | 9/2020 | Feng ................ H04L 5/0053 |
| 2020/0358487 A1 | 11/2020 | Yang et al. |
| 2020/0359372 A1 | 11/2020 | Du |
| 2020/0374042 A1 | 11/2020 | Feng et al. |
| 2021/0006376 A1* | 1/2021 | Cirik ................ H04L 5/0094 |
| 2021/0050945 A1 | 2/2021 | Brown et al. |
| 2021/0051670 A1 | 2/2021 | Fakoorian et al. |
| 2021/0051672 A1* | 2/2021 | Rastegardoost .... H04W 74/006 |
| 2021/0058189 A1* | 2/2021 | Xiao ................ H04L 1/0038 |
| 2021/0234643 A1 | 7/2021 | Wang et al. |
| 2021/0344455 A1* | 11/2021 | Choi ................ H04W 72/0453 |
| 2021/0385826 A1* | 12/2021 | Moon ................ H04L 1/0046 |
| 2022/0046655 A1 | 2/2022 | Wang |
| 2022/0053546 A1 | 2/2022 | Shi et al. |
| 2022/0061074 A1 | 2/2022 | Babaei et al. |
| 2022/0265549 A1* | 8/2022 | Spargo ................ A61P 11/00 |
| 2023/0422067 A1* | 12/2023 | Kwak ................ H04W 24/08 |

FOREIGN PATENT DOCUMENTS

| | | |
|---|---|---|
| CN | 107113841 A | 8/2017 |
| CN | 109964434 A | 7/2019 |
| EP | 3529930 A1 | 8/2019 |
| JP | 2019507964 A | 3/2019 |

OTHER PUBLICATIONS

"Clarification to the dynamically scheduled PDSCH collision with SPS-PDSCH", 3GPP TSG RAN WG1 #98bis, R1-1911206, Nokia, Nokia Shanghai Bell, Chongqing, P.R. China, Oct. 14-20, 2019, 4 pages.

"Discussion on PUSCH resource collision and DL SPS enhancement", 3GPP TSG RAN WG1 Meeting #98 R1-1908600, CATT, Prague, CZ, Aug. 26-30, 2019, 8 pages.

"ETSI TS 138 331 V15.2.1", 5G; NR; Radio Resource Control (RRC); Protocol specification (3GPP TS 38.331 version 15.2.1 Release 15), Jun. 2018, 1-299.

3GPP, "3rd Generation Partnership Project; Technical Specification Group Radio Access Network; NR; Medium Access Control (MAC) protocol specification (Release 15)", 3GPP TS 38.321 V15.7.0, Sep. 2019, 1-78.

3GPP, "3rd Generation Partnership Project; Technical Specification Group Radio Access Network; NR; Multiplexing and channel coding (Release 15)", 3GPP TS 38.212 V15.3.0, Sep. 2018, 1-99.

3GPP, "3rd Generation Partnership Project; Technical Specification Group Radio Access Network; NR; Physical channels and modulation (Release 15)", 3GPP TS 38.211 V15.3.0, Sep. 2018, 1-96.

3GPP, "3rd Generation Partnership Project; Technical Specification Group Services and System Aspects; System Architecture for the 5G System (5GS); Stage 2 (Release 16)", 3GPP TS 23.501 V16.2.0, Sep. 2019, 1-391.

Asia Pacific Telecom, "UCI enhancements for NR URLLC", 3GPP TSG-RAN WG1 Meeting #98bis, R1-1910850, Chongqing, China, Oct. 14-20, 2019, 1-5.

Unknown, Author, "3rd Generation Partnership Project; Technical Specification Group Radio Access Network; NR; Physical layer procedures for data (Release 15)", 3GPP TS 38.214 V15.7.0, Sep. 2019, pp. 1-106.

* cited by examiner

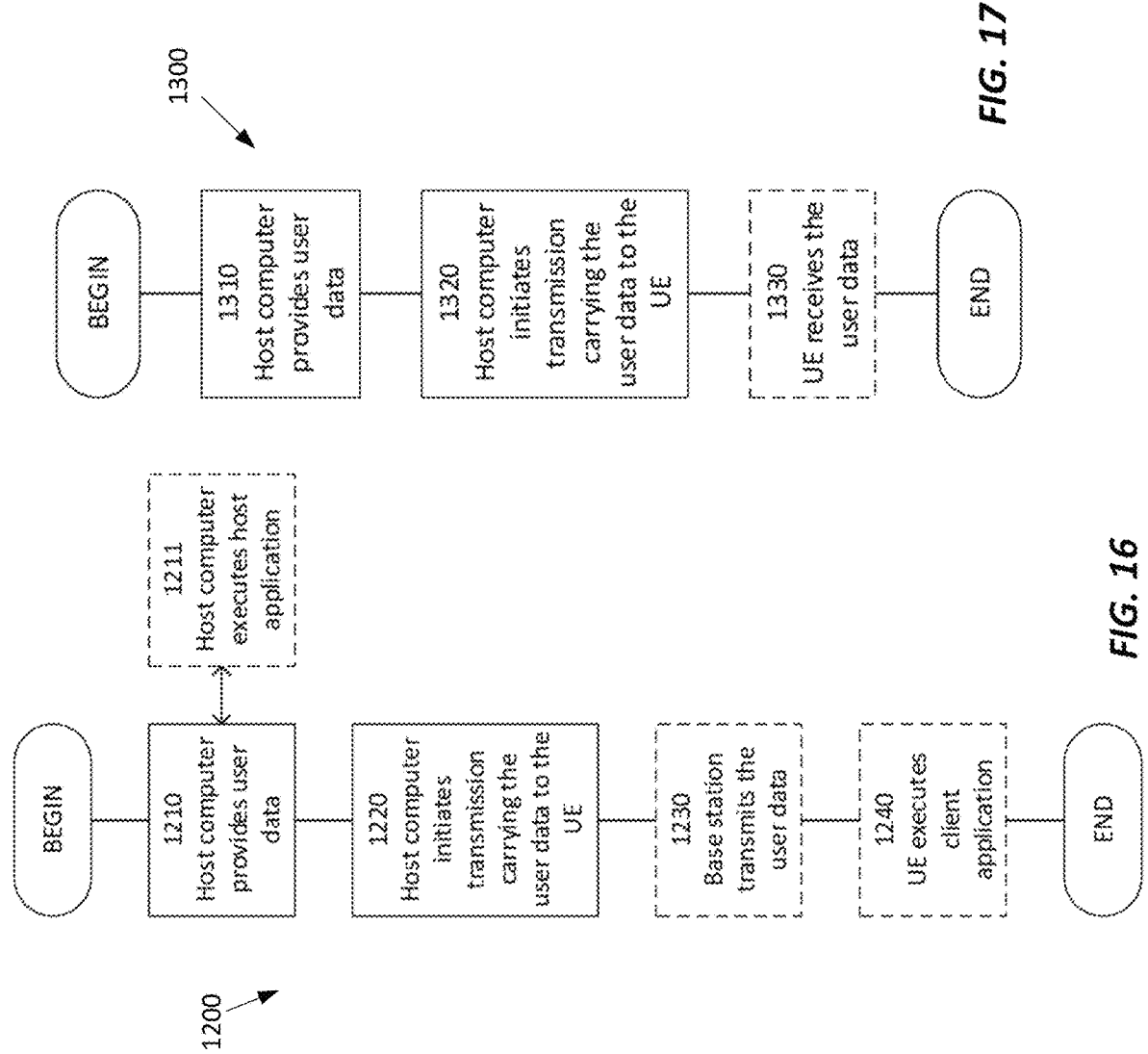

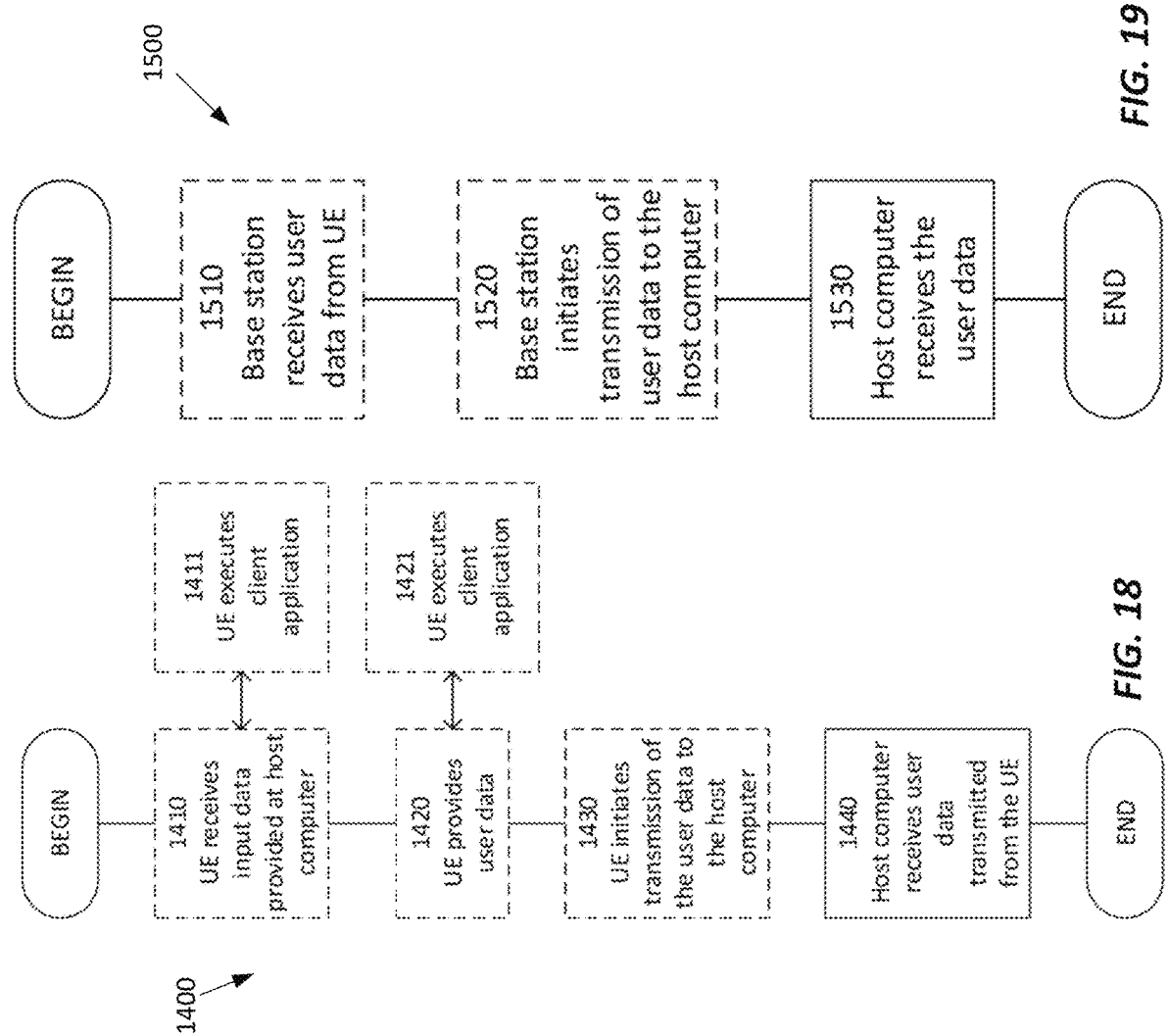

METHODS AND APPARATUSES FOR HANDLING CONFIGURED AND DYNAMIC DOWNLINK TRANSMISSIONS IN A WIRELESS COMMUNICATION NETWORK

RELATED APPLICATIONS

This application is a continuation of U.S. application Ser. No. 18/508,422 filed 14 Nov. 2023, which is a continuation of U.S. application Ser. No. 17/767,077 filed 7 Apr. 2022, which is a U.S. National Phase of PCT/SE2020/050960 filed 8 Oct. 2020, which claims benefit of Provisional Application No. 62/914,268 filed 11 Oct. 2019. The entire contents of each aforementioned application is incorporated herein by reference.

TECHNICAL FIELD

This disclosure relates to wireless communication networks, such as a network based on 5G NR specifications, and, in particular, relates to handling configured and dynamic downlink transmissions, from the perspective of a User Equipment (UE) and a radio network node.

BACKGROUND

Fifth Generation (5G) New Radio (NR) specifications promulgated by the Third Generation Partnership Project (3GPP) provide a range of communication services or service types tailored for various use cases. Example service types include enhanced mobile broadband (eMBB), ultra-reliable and low latency communication (URLLC), and machine type communication (MTC). Each of these services has different technical requirements. For example, the general requirement for eMBB is high data rate with moderate latency and moderate coverage, while URLLC service requires a low latency and high reliability transmission, but perhaps for moderate data rates.

FIG. 1 illustrates an example time-frequency grid associated with an Orthogonal Frequency Division Multiplex (OFDM) carrier, where a "resource element" is the smallest allocable radio resource and may be understood as representing the intersection of one OFDM subcarrier with one OFDM symbol time. By way of example, FIG. 1 illustrates a 15 kHz subcarrier spacing (SCS), although NR provides for different subcarrier spacings.

To better appreciate the accommodation of different subcarrier spacings in an example case, a radio frame spans 10 milliseconds, each frame includes ten subframes of 1 millisecond each, with each subframe divided into one or more slots, in dependence on the SCS, and with each slot comprising a defined number of symbols, e.g., 14 symbols. With slot-based scheduling, a slot represents the smallest transmission interval, but the use of smaller transmission intervals is one key mechanism for reducing communication latency on the radio link.

Correspondingly, NR provides for mini-slot transmissions that are smaller than one slot, e.g., with 14 symbols comprised in a slot, a mini-slot transmission occupies from 1 to 14 symbols. The concepts and uses of the slot and mini-slot are not specific to a service type and apply not only to URLLC but also to eMBB and other services.

Another point of flexibility in NR relates to resource allocation for the Physical Downlink Shared Channel (PDSCH) used for carrying user data (traffic) to a User Equipment (UE) operating in the network. Downlink Control Information (DCI) sent to a UE by the network includes a time domain resource allocation field and a frequency domain resource allocation field, to indicate the resources used for a PDSCH within the involved slot. The time domain resource allocation field can indicate a slot information and a start and length indicator value, the start and length indicator together can be used identify PDSCH duration. For normal Cyclic Prefix (CP), up to 14 symbols per slot are available for PDSCH resource allocation.

Further, NR supports both semi-persistent scheduling (SPS) and dynamic scheduling for the PDSCH. With dynamic scheduling, a separate DCI (transmission) schedules each PDSCH, whereas SPS provides or defines a reoccurring PDSCH, subject, of course, to modification or termination. Because SPS allocates or configures radio resources on a semi-persistent basis, a PDSCH defined by a semi-persistent grant may be referred to as a "configured PDSCH." Conversely, a PDSCH defined by a dynamically scheduled grant may be referred to as a "dynamic scheduled PDSCH" or, for greater convenience, a "dynamic PDSCH."

PDSCH processing time is also quite flexible, in NR and can be based on UE processing capability. Pipelined PDSCH processing is also supported. Pipelined processing enables fast PDSCH processing time, as well as fast feedback times, in comparison to Long Term Evolution (LTE).

SUMMARY

Techniques disclosed herein efficiently address prioritization by a UE regarding its reception behavior with respect to a configured downlink transmission that is overlapped by a dynamic assignment and/or the dynamic downlink transmission scheduled via the dynamic assignment.

In at least one embodiment having applicability to operation of the UE in a communication network based on the 5G NR specifications, the techniques disclosed herein provide for predictable behavior by the UE as to when the UE prioritizes a configured Physical Downlink Shared Channel (PDSCH) versus another PDSCH. For example, at least one such embodiment defines UE behavior with respect to a PDSCH that is scheduled in a primary cell of the UE with C-RNTI or MCS-C-RNTI and another PDSCH that is scheduled in the primary cell with CS-RNTI, in the case that the two PDSCHs partially or fully overlap in time, and/or where the PDCCH of a dynamically-granted PDCCH at least partially overlaps a configured PDSCH.

For example, the UE accounts for the relative timing between the start of a configured downlink assignment PDSCH duration and the time of the PDCCH that schedules the dynamically assigned PDSCH. In at least one embodiment or example, if a dynamically assigned PDSCH duration and configured downlink assignment PDSCH duration have an overlap, then the dynamically assigned PDSCH is prioritized, if the corresponding PDCCH that schedules the dynamically assigned PDSCH ends before the start of the configured downlink assignment PDSCH. In another embodiment or example, if the dynamically assigned PDSCH duration and the configured downlink assignment PDSCH duration have an overlap, then the configured downlink assignment PDSCH is prioritized, if the corresponding PDCCH that schedules the dynamically assigned PDSCH ends after the beginning of the configured downlink assignment PDSCH.

Among the various advantages of the methods and apparatuses disclosed herein, the embodied techniques ensure proper prioritization between dynamically assigned PDSCH and configured downlink assignment PDSCH, while considering UE processing timeline constraints, while at the same time ensuring flexibility for the network in adapting resource allocation for a UE. Flexibility flows from enabling a timely dynamic assignment for PDSCH to override a configured downlink assignment PDSCH. With the solution, both the involved network node(s) and the UE can take advantage of predictable UE behavior and, thereby, improve the overall system performance.

Of course, the present invention is not limited to the above features and advantages. Those of ordinary skill in the art will recognize additional features and advantages upon reading the following detailed description, and upon viewing the accompanying drawings.

BRIEF DESCRIPTION OF THE DRAWINGS

FIGS. 16-19 are logic flow diagrams of example methods of operation by or between a UE, a base station, and a host computer, such as seen in FIGS. 14 and 15.

DETAILED DESCRIPTION

Regarding dynamically assigned PDSCH and configured downlink assignment PDSCH with overlapping PDSCH durations, the specified approaches do not take processing time aspects into consideration. See, for example, Section 5.1 of 3GPP TS 38.214 V15.7.0, where unpredictable UE behavior arises, e.g., in the context of a UE abandoning or deprioritizing a configured PDSCH in the presence of a dynamic PDSCH.

For a better understanding of SPS and configured PDSCHs, semi-persistent grants also referred to as configured downlink assignments-provide for semi-persistent (reoccurring) downlink data transmissions with reduced control channel overhead. That is, in comparison to dynamic PDSCHs, a separate transmission of DCI is not required for the individual PDSCHs defined by a semi-persistent grant.

The involved radio scheduler serving a UE, e.g., in a serving gNB (an NR base station), may use a semi-persistent grant to allocate PDSCHs to a UE, with a certain periodicity. Configuring resources in this manner complements certain services, such as VOIP traffic which comprises reoccurring (ongoing) voice data frames. A configured downlink assignment is activated by sending Physical Downlink Control Channel (PDCCH) indicating an SPS activation—i.e., a PDCCH that activates semi-persistent transmissions and includes some scheduling information, such as Modulation and Coding Scheme (MCS) information, coding scheme, resource allocation, etc.

Other scheduling information, such as Hybrid Automatic Repeat reQuest (HARQ) process number, the periodicity of the semi-persistent resource, etc., may be configured by higher layers. For example, the periodicity can be indicated in terms of the number of slots that define the periodicity of the PDSCHs, or can be indicated in milliseconds, e.g., a 20 millisecond (ms) periodicity. Once an SPS activation PDCCH is received by a UE, the UE knows it has a semi-persistent resource occurring according to the specified periodicity, e.g., every 20 milliseconds.

Figure 2:
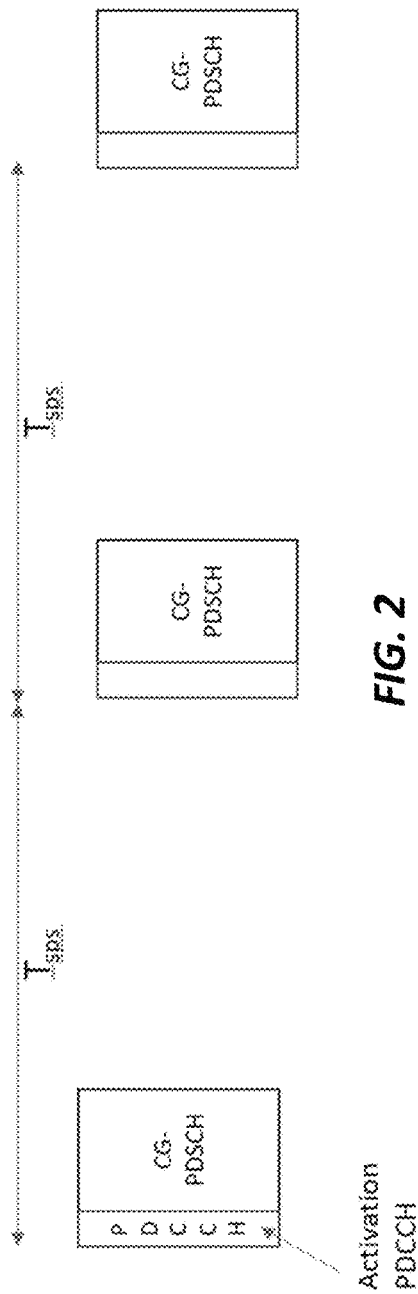
FIG. 2 is a diagram of an example arrangement of reoccurring (configured) downlink transmissions for a UE.

FIG. 2 shows an example where "Tsps" indicates the periodicity for the configured radio resources allocated as reoccurring PDSCHs—i.e., configured PDSCHs, which are denoted as "CG-PDSCHs" in the diagram. The diagram also depicts the SPS-activation PDCCH used to activate the semi-persistent grant. "CG-PDSCH" serves as a convenient label for configured PDSCHs, but it may be used interchangeably with "SPS-PDSCH."

The network can adapt a semi-persistent transmission occasion (or opportunity) in a slot by sending a dynamic scheduling assignment that overrides the semi-persistent transmission in the slot. For example, the NW schedules some other packet, or chooses to dynamically adapt the resource allocation or MCS level for the ongoing packet. In such cases, according to the currently-specified behavior, the UE is supposed to follow the dynamically scheduled assignment, because that provides NW more flexibility in performing link adaptation and resource management. Also, note that for a semi-persistent scheduled transport block, retransmissions can be scheduled using dynamic assignments using the same RNTI and HARQ process.

Various cases or scenarios apply as regards the scheduling for CG-PDSCHs. For example, a UE receives an SPS-Activation PDCCH that schedules a first CG-PDSCH in the same occasion and schedules the further, subsequent CG-PDSCHs, which are received without receiving an associated PDCCH. FIG. 2 depicts such an example. CG-PDSCH retransmissions may be scheduled according to PDCCH based on a Configured Scheduling Radio Network Temporary Identifier (CS-RNTI), i.e. dynamic retransmission. The semi-persistent grant of reoccurring CG-PDSCHs may be deactivated by transmitting an SPS deactivation PDCCH or an SPS PDSCH resource release.

An SPS activation PDCCH may use a Cyclic Redundancy Check (CRC) scrambled by the CS-RNTI, and dynamically assigned PDSCH may be scheduled using a CS-RNTI, a Cell RNTI (C-RNTI), or a Modulation-and-Coding-Scheme RNTI (MCS-C-RNTI). As noted before, a dynamic PDCCH is dynamically assigned for the UE, e.g., using a dynamic downlink assignment to the UE.

To better understand UE behavior according to the applicable current specifications defining Medium Access Control (MAC) operations and behaviors, the current specifications address the potential overlap between a CG-PDSCH and a dynamic PDSCH, which may be conveniently noted as a "D-PDSCH." For each configured and activated downlink assignment (semi-persistent grant) in each serving cell of the UE, if the PDSCH duration of the configured downlink assignment does not overlap with the PDSCH duration of a downlink assignment received on the PDCCH for this Serving Cell, the MAC entity of the UE shall: instruct the physical layer to receive, in this PDSCH duration, the transport block on the DL-SCH according to the configured downlink assignment and to deliver it to the HARQ entity; set the HARQ Process ID to the HARQ Process ID associated with this PDSCH duration; consider the New Data Indicator (NDI) bit for the corresponding HARQ process to have been toggled; and indicate the presence of a configured downlink assignment and deliver the stored HARQ information to the HARQ entity.

Further according to the current MAC specifications for NR, a "PDCCH occasion" is a time duration (i.e. one or a consecutive number of symbols) during which the MAC entity of the UE is configured to monitor the PDCCH.

According to above details, with respect to a serving cell of the UE, the UE follows a configured downlink assignment only if the PDSCH duration of the configured downlink assignment does not overlap with the PDSCH duration of a downlink assignment received on the PDCCH for this serving cell. Problematically, such behavior does not account for any processing timeline of the UE or processing time constraints of the UE and may cause undue burden regarding UE implementation. As a specific articulation of pertinent details from the applicable current specifications, according to the 3GPP TS 38.214, a UE is not expected to decode a PDSCH scheduled in the primary cell with C-RNTI or MCS-C-RNTI and another PDSCH scheduled in the primary cell with CS-RNTI, if the PDSCHs partially or fully overlap in time.

Figure 3:
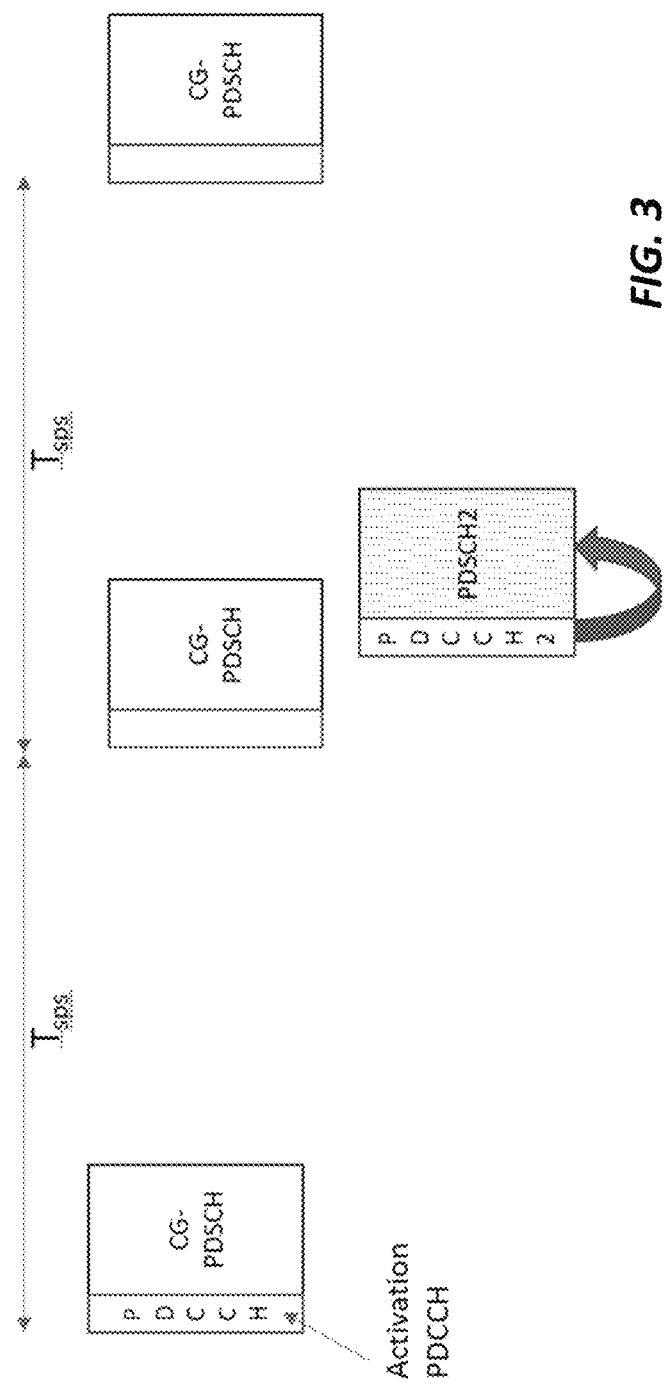
FIGS. 3-7 are diagrams of example scenarios illustrating different time relationships as between a configured downlink transmission and a dynamic assignment and the corresponding dynamic downlink transmission.

Consider the example in FIG. 3. An activation PDCCH activates reoccurring PDSCHs—shown as CG-PDSCHs—for a UE. The UE receives a PDCCH (labeled as "PDCCH2" to distinguish it) dynamically granting a PDSCH (labeled as "PDSCH2" to distinguish it) that overlaps in time with one of the CG-PDSCHs. Here, the PDSCH2 may be scheduled/granted using C-RNTI or an MCS-C-RNTI. The applicable current MAC specifications in NR state that the UE shall prioritize PDSCH2 over the CG-PDSCH that is overlapped by it.

However, from a hardware or signal-processing perspective, the UE may have already begun processing the CG-PDSCH and, depending on its capabilities and characteristics, the UE may not be able to prioritize PDSCH2 as the specification would imply. Thus, the UE should be able to (a) ignore PDCCH2 and the corresponding PDSCH2, i.e., consider it as an invalid assignment, or (b) deprioritize the CG-PDSCH and follow PDCCH2 and the corresponding PDSCH2 processing. If the CG-PDSCH is deprioritized, the UE may pause decoding of the CG-PDSCH but may still provide a corresponding feedback information (ACK or a NACK) for transmission in an uplink message, e.g., a Physical Uplink Control Channel (PUCCH) transmission. Note that de-prioritization may result in wasteful processing at the UE.

Broadly, then, the applicable current MAC specifications for NR are problematic in several regards, not least that they do not consider timelines at the UE, i.e., with respect to PDCCH occasions or PDSCH occasions.

One contemplated option is to allow the UE to prioritize which PDSCH to process, as between overlapping PDSCHs. However, a corresponding complication is that the serving base station or the network at large may not know which PDSCH was processed completely or incompletely. That lack of visibility in the network may result in certain performance losses that are avoided with predictable UE behavior that is known to the network. Thus, one aspect of the techniques contemplated herein involves defining a rule or behavioral logic by a UE predictably chooses to prioritize a CG-PDSCH versus another PDSCH.

In one embodiment or operating scenario, the UE is configured to prioritize dynamic assignments over SPS assignments, but only when the dynamic assignments in question are timely from a UE processing perspective, and processable in a predictable manner. As an example, the UE prioritizes a dynamic assignment over an SPS assignment, if the dynamic assignment is received in a PDCCH occasion that ends before the start of the PDSCH duration associated with the SPS assignment. More particularly, in an example involving a D-PDSCH that at least partially overlaps in time with a CG-PDSCH, the UE prioritizes reception of the D-PDSCH, if the PDCCH granting the D-PDSCH is received before the start of the PDSCH duration of the overlapped CG-PDSCH.

Correspondingly, consider the case of a D-PDSCH that at least partially overlaps a CG-PDSCH but where the PDCCH for the D-PDSCH arrives "late." In such cases, the UE may ignore or deprioritize the D-PDSCH. Here, a "late" arrival of the PDCCH for the D-PDSCH may be understood as the PDCCH arriving after the start of the PDSCH duration of the CG-PDSCH, or otherwise arriving after the UE begins processing the CG-PDSCH.

In the example of FIG. 3, PDCCH2 starts after the overlapped CG-PDSCH starts. Therefore, the UE does not prioritize the PDSCH2, i.e., it decodes the CG-PDSCH and may ignore the PDCCH2 and the PDSCH2.

Figure 4:
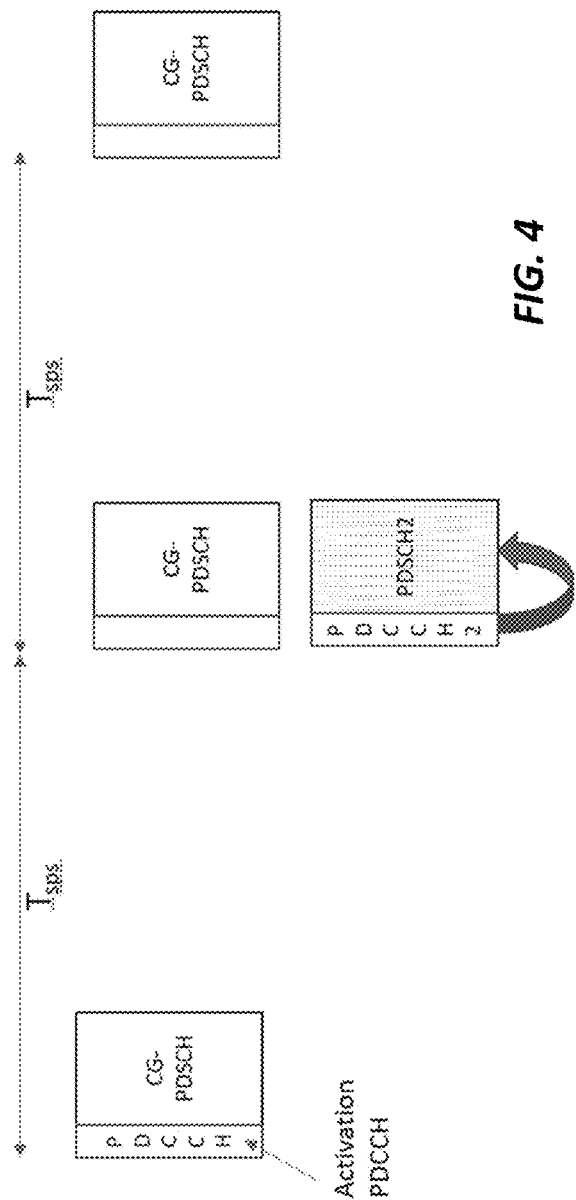

In the example of FIG. 4, the UE prioritizes the PDSCH2, because the PDCCH2 ends before the overlapped CG-PDSCH begins. As such, the UE decodes the PDSCH2 and considers the configured downlink assignment for the CG-PDSCH as being overridden.

Figure 5:
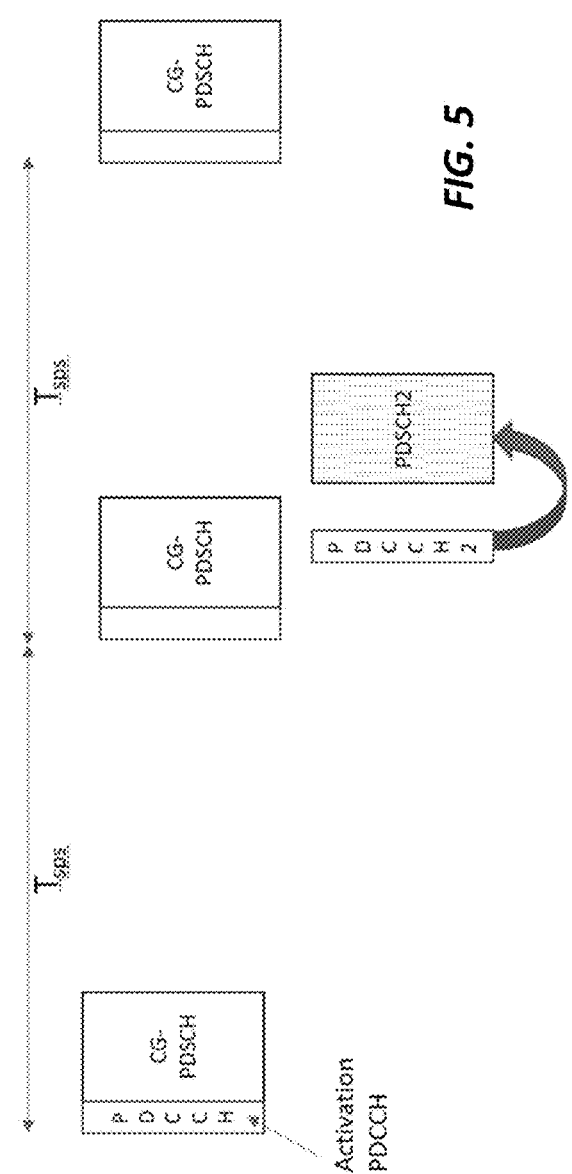

In the example of FIG. 5, the UE decodes overlapped CG-PDSCH and either ignores the PDCCH2 or decodes it in addition to the CG-PDSCH. Whether the UE also decodes PDSCH2 depends on any one or more of: whether the UE is capable of decoding more than one PDSCH in the same slot, whether the UE does or does not have such capability, or on its current configuration, which may be set by the network. Put simply, in at least one embodiment or scenario, the UE ignores a D-PDSCH if the corresponding grant comes after the start of the duration of a CG-PDSCH, and, in at least one other embodiment or scenario, the UE decodes both the CG-PDSCH and the D-PDSCH, although it may prioritize the CG-PDSCH.

Figure 6:
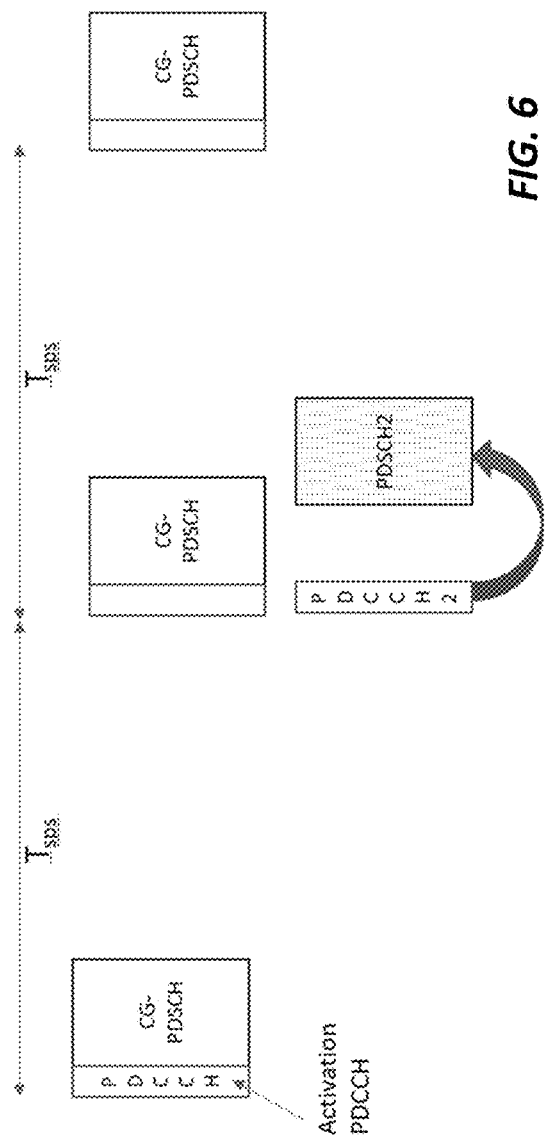
Figure 7:
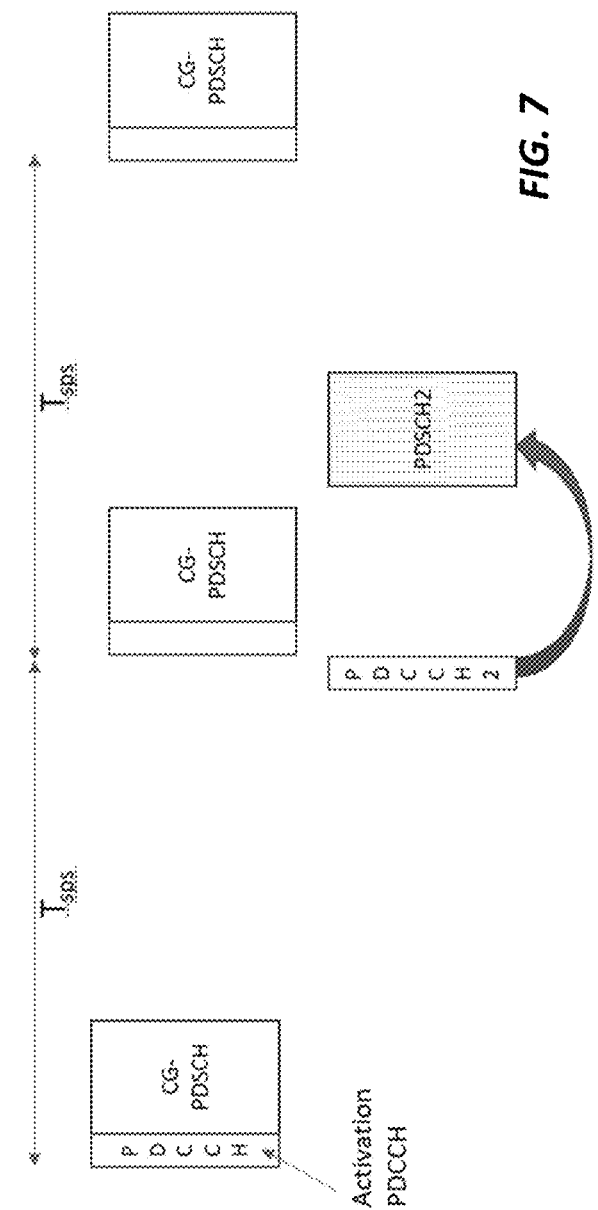

In FIG. 6, because the PDCCH2 ends before the CG-PDSCH starts, the UE can decode the PDSCH2. The configured downlink assignment for CG-PDSCH is considered overridden. See FIG. 7 for an example of the PDCCH2 ending before the CG-PDSCH starts, and where the D-PDCCH (PDSCH2) granted by PDCCH2 begins after the duration of the CG-PDSCH.

In another aspect of the techniques contemplated herein, the UE, at least as a general proposition, prioritizes an ongoing transmission. For example, it prioritizes a PDSCH transmission that is in the decoding pipeline of the UE. Corresponding example configurations or behaviors of the UE include any one or more of the following: (1) the UE may wait until the result of "PDCCH decoding" to start PDSCH processing; (2) for PDCCH and PDSCH overlapping in symbols, the UE may need some additional PDSCH processing time relaxation; (3) for "Type A" PDSCH allocations, the PDSCH can start up to 2 symbols before PDCCH; (4) for "Type B" PDSCH allocations, the PDSCH cannot start any earlier than corresponding PDCCH start;

and (5) the minimum processing time for a PDSCH assigned by configured downlink assignment can be same as the one given by activation PDCCH.

With the above examples and details in mind, a UE in one or more embodiments acquires configuration information related to semi-persistent scheduling for downlink. The UE receives a configured downlink assignment for a serving cell, to start in an associated PDSCH duration and to recur according to a set of rules. The UE selects a PDSCH from a first PDSCH and a second PDSCH that have an overlapping PDSCH duration, wherein the first PDSCH is based on the configured downlink assignment and the second PDSCH is based on a downlink assignment received in a PDCCH. The selection is based on a timing relationship between the start of the first PDSCH and an ending time of the PDCCH scheduling the second PDSCH. The UE decodes the selected PDSCH.

In at least one embodiment, the UE selects the second PDSCH, if the corresponding PDCCH scheduling the dynamically assigned PDSCH ends before the start of the first PDSCH. The UE selects the first PDSCH, if the PDCCH scheduling the second PDSCH ends after the beginning of the first PDSCH. In a case where the PDCCH ends before the start of the first PDSCH, the end of the PDCCH is N OFDM symbols before start of the first PDSCH, where N can be 0 in at least one embodiment.

The end of the PDCCH also may be defined with respect to UE processing time. For example, the end of the PDCCH is Tproc,1 before the start of the first PDSCH. Tproc,1 can be the UE processing time for PDSCH, according to the configured PDSCH processing capability such as capability 1 or 2, and associated dependency on numerology.

In another example, the end of the PDCCH may be defined in terms of slots. For example, the end of PDCCH is X slots before the slot corresponding to the start of the first PDSCH. Thus, there may be multiple ways or definitions for assessing whether the end of PDCCH for the second PDSCH is before the start of the first PDSCH.

Further, a UE may not "expect" to be scheduled by a PDCCH ending in symbol i to receive a PDSCH on a given serving cell overlapping in time with a PDSCH occasion, where the UE is allowed to receive a PDSCH with configured downlink assignment, starting in a symbol j on the same serving cell if the end of symbol i is not at least X symbols before the beginning of symbol j. The value of X can be 0; or the value of X can be N3, which is the minimum processing time for DL-SPS release; or the value of X can be N1, which is the minimum PDSCH processing time according to the capability.

The value X in symbols may be determined according to the UE processing capability and the symbol duration is based on the minimum of the subcarrier spacing corresponding to the PDSCH with configured downlink assignment and the subcarrier spacing of the PDCCH scheduling the PDSCH.

If a dynamically assigned PDSCH duration and configured downlink assignment PDSCH duration have an overlap, then the dynamically assigned PDSCH is prioritized or selected if the corresponding PDCCH scheduling the dynamically assigned PDSCH ends before the start of the configured downlink assignment PDSCH.

If a dynamically assigned PDSCH duration and configured downlink assignment PDSCH duration have an overlap, then the configured downlink assignment PDSCH is prioritized or selected if the corresponding PDCCH scheduling the dynamically assigned PDSCH ends after the beginning of the configured downlink assignment PDSCH.

As a specific but non-limiting example, assume a single numerology, 14 symbols in a slot, that CG-PDSCH is in symbols j1 to j2 in the slot, and that the dynamic-assignment PDCCH is in symbols m1 to m2 in the slot and indicates a D-PDSCH in symbols k1 to k2 in the slot. Further, assume there is at least one symbol overlap in the PDSCH durations j1 to j2 and k1 to k2. Then if $m2<j1$, the dynamically assigned PDSCH is prioritized. If $m1>=j1$, then CG-PDSCH is prioritized.

In another example embodiment, or in another example family of embodiments, the UE acquires configuration information related to semi-persistent scheduling for downlink for a serving cell. The UE receives a configured downlink assignment for the involved serving cell to start in the associated PDSCH duration and to recur according to a set of rules. The UE receives, in a PDSCH duration, a transport block on the DL-SCH according to the configured downlink assignment, wherein the receiving is based on the following condition being satisfied: if the PDSCH duration of the configured downlink assignment does not overlap with the PDSCH duration of a downlink assignment received on the PDCCH for the serving cell and the PDCCH for the serving cell received in a PDCCH occasion that ends before the start of the PDSCH duration of the configured downlink assignment.

The end refers to the end of the last symbol of a PDCCH in the PDCCH occasion. The end, for example, is N OFDM symbols before start of the PDSCH duration, where N can be 0. In another example, the end is Tproc,1 before the start of the PDSCH duration. Tproc,1 can be the UE processing time for PDSCH, according to the configured PDSCH processing capability such as capability 1 or 2, and associated dependency on numerology. In another example, the end is X slots before the slot corresponding to the start of the PDSCH duration.

The below text comes from the currently-applicable version of TS 38.321, but where the underlined, italicized text represents changes contemplated in one or more of the embodiments disclosed herein:

For each Serving Cell and each configured downlink assignment, if configured and activated, the MAC entity shall:

1> if the PDSCH duration of the configured downlink assignment does not overlap with the PDSCH duration of a downlink assignment received on the PDCCH for this Serving Cell and the PDCCH received in a PDCCH occasion that ends before the start of the PDSCH duration of the configured downlink assignment:

2> instruct the physical layer to receive, in this PDSCH duration, transport block on the DL-SCH according to the configured downlink assignment and to deliver it to the HARQ entity;

2> set the HARQ Process ID to the HARQ Process ID associated with this PDSCH duration;

2> consider the NDI bit for the corresponding HARQ process to have been toggled;

2> indicate the presence of a configured downlink assignment and deliver the stored HARQ information to the HARQ entity.

In a corresponding example, assume a single numerology, 14 symbols in a slot, that a CG-PDSCH is in symbols j1 to j2 in the slot, that a dynamic assignment PDCCH is in symbols m1 to m2 in the slot and indicates a PDSCH in symbols k1 to k2 in the slot. Further, assume there is at least one symbol overlap in the PDSCH durations j1 to j2 and k1 to k2.

Then if m2<j1, then dynamically assigned PDSCH is prioritized.

Figure 1:
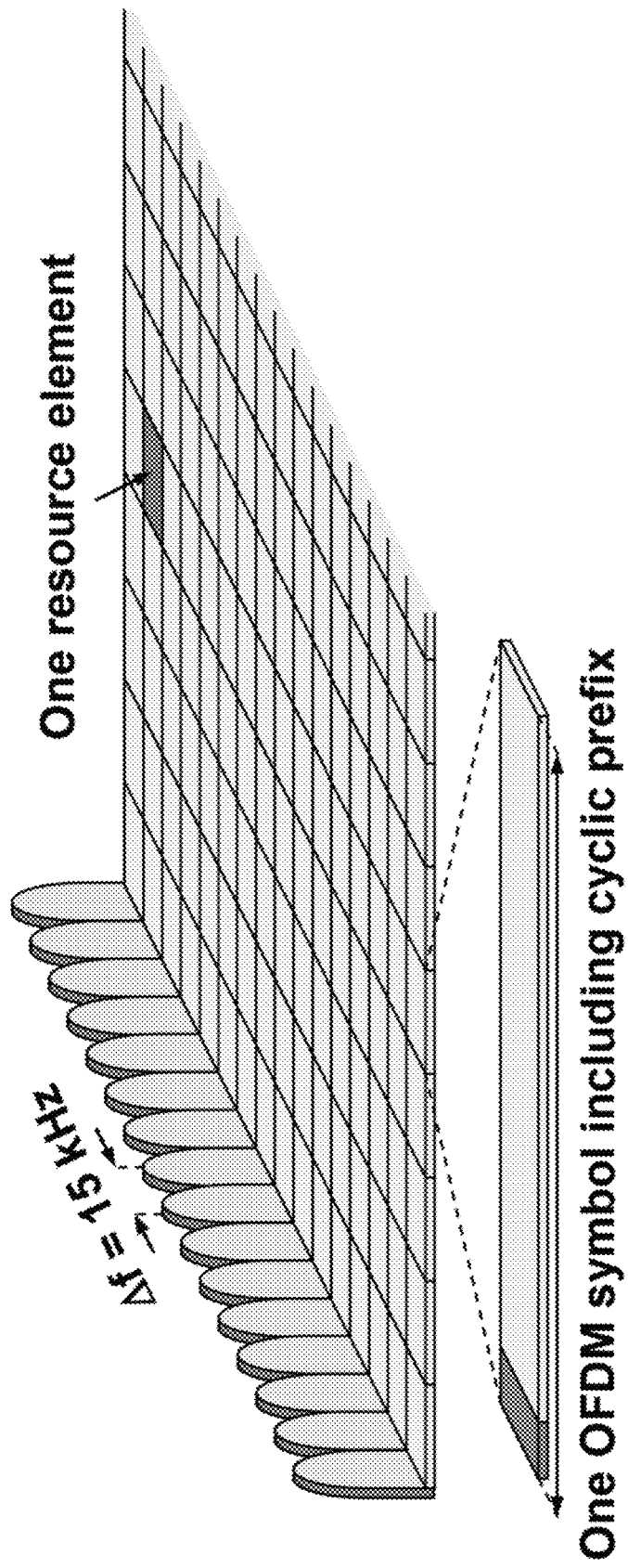
FIG. 1 is a diagram of an example time-frequency grid defined by or for an OFDM carrier.

As an example of a UE carrying out any of the above operations or having any of the above configurations, FIG. 1 is a block diagram of a wireless communication network 10 according to an example embodiment, where the network 10 provides one or more communication services to any number of UEs 12, such as by coupling the UEs 12 to one or more external networks 14, e.g., the Internet. Among other things, the network 10 may operate as an access network that provides access to one or more host computers 16 that are reachable by the UEs 12 through the external network(s) 14.

In a non-limiting example, the network 10 is configured as a Fifth Generation (5G) New Radio (NR) network. Example details for 5G NR implementations of the network 10 appear in various Technical Specifications (TSs) promulgated by the Third Generation Partnership Project (3GPP), such as TS 23.501 V16.2.0 (2019-09-24), TS 38.211 V15.3.0 (2018-09), TS 32.212 V15.3.0 (2018-09), TS 38.213 V15.3.0 (2018-09), and TS 38.331 V15.2.1 (2018-06).

In the example 5G NR context, the network 10 provides Ultra Reliability Low Latency Communication (URLLC) services, enhanced Mobile BroadBand (eMBB) services, etc. The UEs 12, with three UEs 12-1, 12-2, and 12-3 shown merely for example purposes, may be any kind or any mix of UE types and may engage in essentially any type of communications or mix of communication types. Although the term "UE" has particular meanings in the context of 3GPP specifications, the term more broadly connotes essentially any type of wireless communication apparatus or device that is configured for operation in the network 10 but is not part of the permanent or fixed network infrastructure. Commonly, UEs are not owned by the operator or owner of the network 10 and, instead, are owned or associated with third parties that have subscriptions or other agreements that provide for authorized use of the network 10 by their respective UEs.

By way of non-limiting example, any one or more of the UEs 12 may be a smartphone or other mobile communication device, a network adapter or dongle, a Machine Type Communication (MTC) device, an Internet-of-Things (IoT) device, or other wireless communication apparatus that is configured for operating on the air interface (or air interfaces) provided by the network 10. As noted, the air interface may be an NR interface. Additionally, or alternatively, the network 10 provides one or more air interfaces according to other Radio Access Technologies (RATs), such as Long Term Evolution (LTE or 4G).

As a quick point regarding reference numbers, one or more of the drawings may show suffixed reference numbers but the use of reference numbers herein includes suffixing only where the suffixing is needed for clarity. A reference number without suffixing may be used to refer to any given one of the things identified by that reference number, or to refer to any given plurality of the things identified by that reference number. Thus, a "UE 12" refers to a given UE in context, and "the UEs 12" refers to a given two or more UEs in context.

Turning back to further details of the illustrated network 10, the network 10 includes a Radio Access Network (RAN) 20 that includes one or more radio network nodes 22, with two radio network nodes 22-1 and 22-2 shown merely for example. Each radio network node 22 provides radio coverage in a corresponding geographic area or areas and may be regarded as providing one or more network "cells" 24. For example, the radio network node 22-1 provides a cell 24-1 and the radio network node 22-2 provides a cell 24-2. Cell coverage may overlap and any given cell 24 may comprise or be "covered" in a radio-signal sense using beamforming. For example, a radio network node 22 includes an antenna array with a plurality of antenna elements having one or more polarizations, and the radio network node 22 uses digital, analog, or hybrid beamforming to steer or sweep directional radio beams over or within one or more geographical areas, to provide radio service to UEs 12 operating in those areas.

Figures 9, 10, 12:
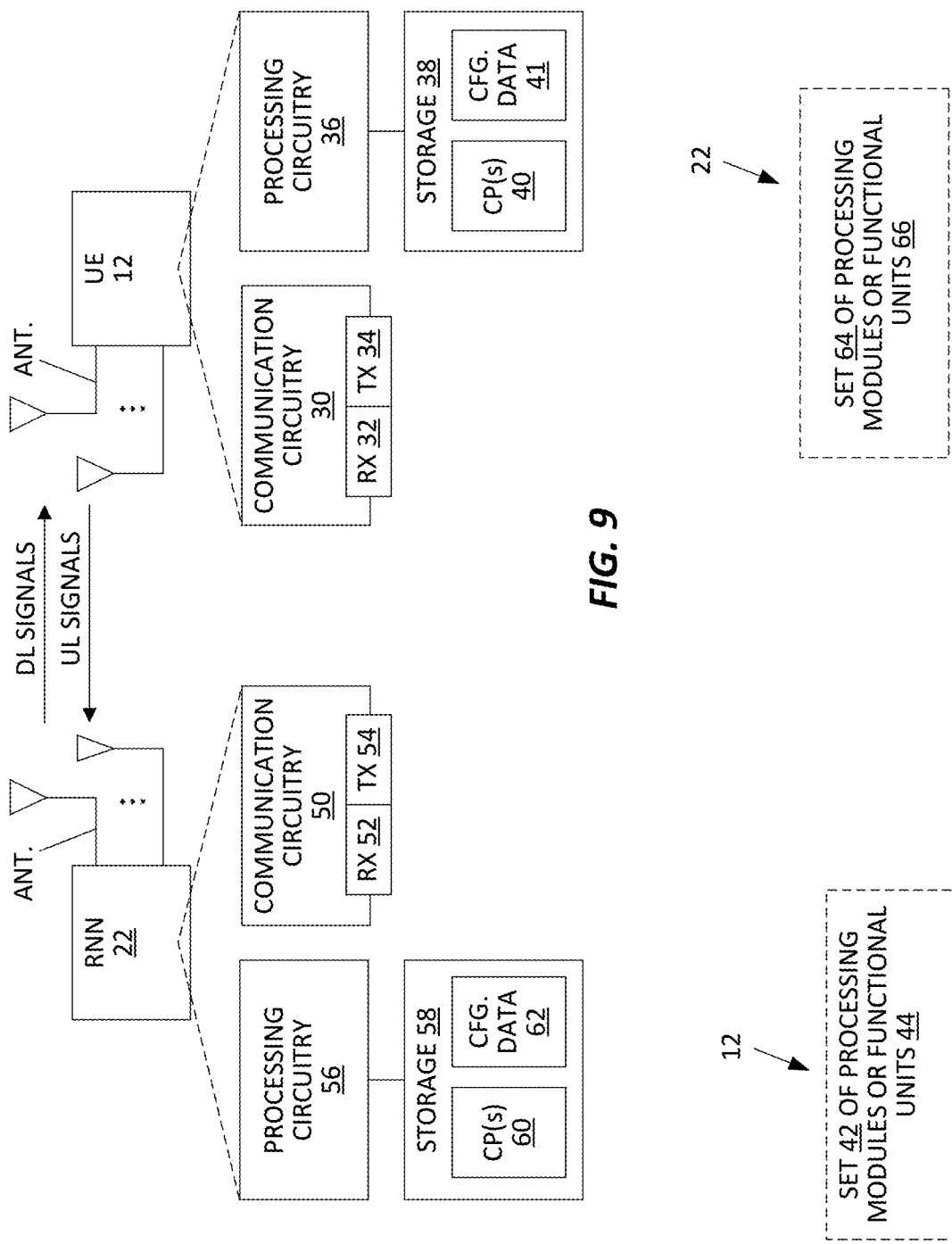
FIG. 9 is a block diagram of example embodiments of a radio network node and a User Equipment (UE).
FIG. 10 is a block diagram of another embodiment of a UE.
FIG. 12 is a block diagram of another embodiment of a radio network node.

FIG. 9 illustrates example embodiments for a UE 12 and a radio network node ("RNN") 22, with the UE 12 including communication circuitry 30 comprising receiver circuitry 32 and transmitter circuitry 34, along with processing circuitry 36, and storage 38. The storage 38 comprises one or more types of computer-readable media, such as one or more kinds of memory circuits or devices. Examples include any one or more of SRAM, DRAM, FLASH, EEPROM, Solid State Disk (SSD), and electromagnetic disk storage.

The processing circuitry 36 comprises one or more types of digital processing circuitry, such as one or more microprocessors, microcontrollers, Digital Signal Processors (DSPs), Field Programmable Gate Arrays (FPGAs), Application Specific Integrated Circuits (ASICs), or one or more Systems-on-a-Chip (SoC). Broadly, the processing circuitry 36 comprises fixed, non-programmable circuitry, or comprises programmed circuitry that is specially adapted to carry out the relevant preemption-related operations described herein for a UE 12 or comprises a mix of fixed and programmed circuitry.

In at least one such embodiment, the UE 12 includes one or more digital processing circuits, such as one or more microprocessors, that are configured as or operative as the illustrated processing circuitry 36, based on their execution of stored computer program instructions. To that end, the storage 38 in one or more embodiments stores one or more computer programs (CPs) 40, where "stores" here does not necessarily connote permanent or unchanging storage but does connote retention of at least some persistence, such as storage in working memory for program execution. The storage 38 in one or more embodiments also provides volatile and/or non-volatile storage for one or more items of configuration data (CFG. DATA) 41. Such data may be pre-provisioned in the UE 12, signaled to the UE 12 by the network 10, or may comprise a mix of pre-provisioned and signaled information.

With the above in mind, a UE 12 configured for operation in a wireless communication network 10 comprises communication circuitry 30 configured for sending signals to and receiving signals from radio network nodes 22 in the network 10. The communication circuitry 30 includes, for example, radio transceiver circuitry configured for radio-based communications in the network 10, such as a radiofrequency receiver 32 and a radiofrequency transmitter 34.

Further, the UE 12 comprises processing circuitry 36 that is operatively associated with the communication circuitry 30. Here, "operatively associated" means that the processing circuitry 36 sends and receives data and control signaling via the communication circuitry 30. For example, the processing circuitry 36 includes or is associated with baseband processing circuitry that implements a radio protocol stack used for receiving radio signals from a radio network node 22 via the communication circuitry 30 and recovering control and data from the received signals, and for encoding and modulating outgoing control information and data, for transmission via the communication circuitry 30.

The processing circuitry 36 in one or more embodiments is configured to decode the configured downlink transmission and not a dynamic downlink transmission and a dynamic assignment associated therewith, responsive to the dynamic assignment at least partially overlapping in time with the configured downlink transmission. Further, the processing circuitry 36 is configured to decode the dynamic downlink transmission and not the configured downlink transmission, responsive to the dynamic assignment timewise ending before the configured downlink transmission began, at least in a case where the dynamic downlink transmission at least partially overlaps the configured downlink transmission in time.

Here, the question of overlap refers to the transmission time/duration of the dynamic assignment overlapping (at least in part) with the transmission time/duration of the configured downlink assignment. The dynamic assignment is, for example, a PUCCH transmission that dynamically schedules a PDSCH as the dynamic downlink transmission, and the configured downlink transmission is one among a number of reoccurring PDSCHs granted via semi-persistent scheduling.

FIG. 10 illustrates another example embodiment of the UE 12, where the UE 12 comprises a set 42 of processing modules or functional units 44, such as may be realized or instantiated via the execution of computer program instructions via one or more processors or other type(s) of digital processing circuitry. The UE 12 of FIG. 10 may be configured to carry out any of the processing operations described herein for a UE.

Figure 11:
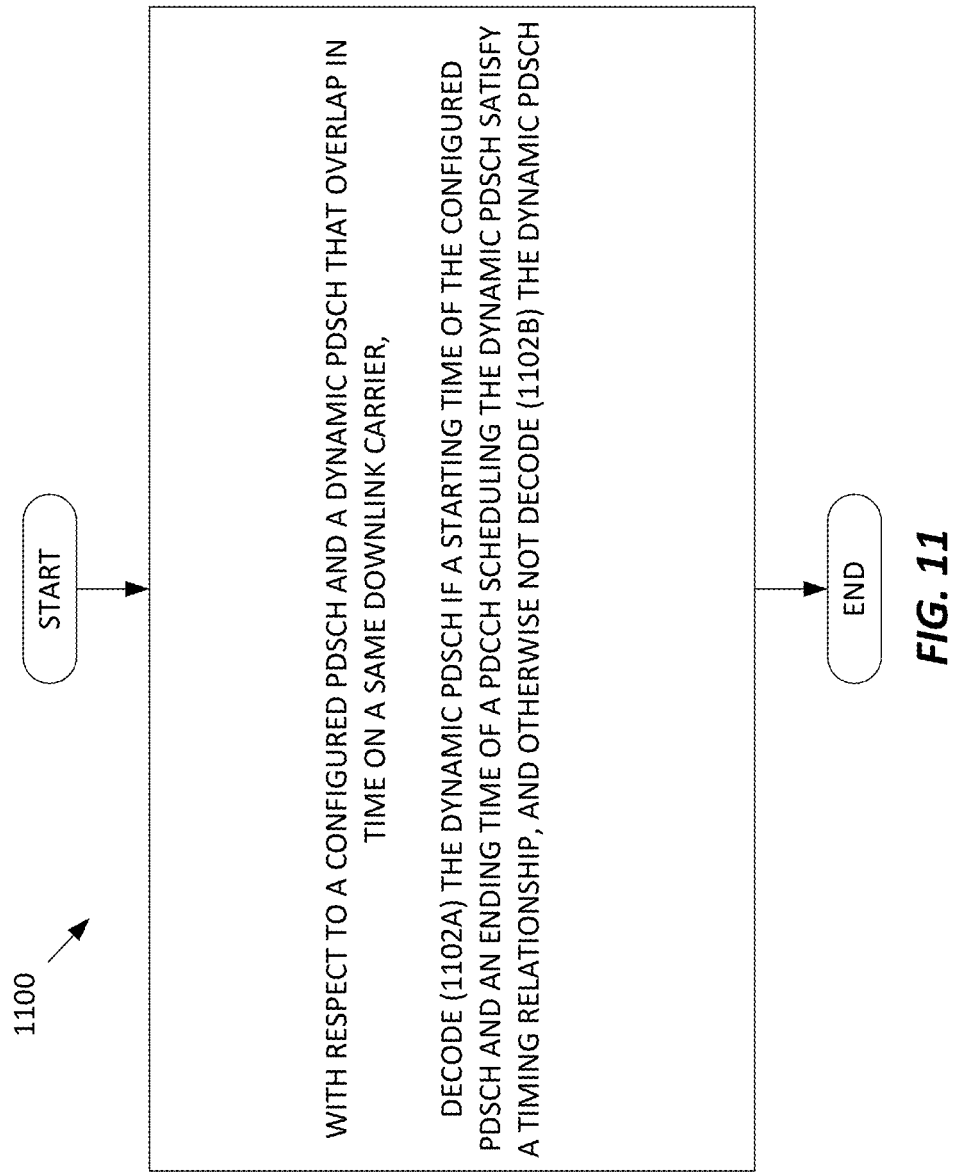
FIG. 11 is a logic flow diagram of one embodiment of a method of operation by a UE.

FIG. 11 illustrates a method 1100 of operation performed by a UE 12 in one or more embodiments herein. With respect to a configured PDSCH and a dynamic PDSCH that overlap in time on a same downlink carrier, the method 1100 includes decoding (1102A) the dynamic PDSCH if a starting time of the configured PDSCH and an ending time of a PDCCH scheduling the dynamic PDSCH satisfy a timing relationship, and otherwise not decoding (1102B) the dynamic PDSCH. For example, if the timing relationship is not satisfied, the UE 12 decodes the configured PDSCH and does not decode the dynamic PDSCH.

In an example embodiment, a method performed by a UE 12 operating in a wireless communication network includes the UE 12 decoding a dynamic PDSCH that overlaps on a same Downlink (DL) carrier with a configured PDSCH, if a starting time of the configured PDSCH and an ending time of a PDCCH scheduling the dynamic PDSCH satisfy a timing relationship, and otherwise not decoding the dynamic PDSCH. That is, if the timing relationship is satisfied, the UE 12 decodes the dynamic PDSCH and, if the timing relationship is not satisfied, the UE 12 does not decode the dynamic PDSCH, e.g., the UE 12 instead decodes the configured PDSCH.

The method in one or more embodiments includes the UE 12 receiving signaling from a network node of the wireless communication network, where the signaling indicates semi-persistent resources assigned to the UE 12 for reception of the configured PDSCH. For example, the UE 12 receives an initial grant—an SPS grant—that grants radio resources in reoccurring instances, such that the UE 12 has a configured PDSCH in one or more subsequent occasions without receiving a corresponding PDCCH in each such subsequent occasion.

With that point in mind, in an example embodiment, a UE 12 performs a method that includes the UE 12 decoding a first PDSCH if a timing relationship is satisfied, and otherwise decoding a second PDSCH. Here, the first and second PDSCHs overlap in time on a same Downlink (DL) carrier and the first PDSCH has a corresponding PDCCH and the second PDSCH does not have a corresponding PDCCH. That is, the UE 12 receives a PDCCH that dynamically schedules the first PDSCH but does not receive a PDCCH for the second PDSCH in the interval in question, e.g., the second PDSCH was configured at some earlier time. The timing relationship at issue is between an ending time of the PDCCH corresponding to the first PDSCH and a starting time of the second PDSCH. For example, the UE 12 decodes the first PDSCH if there is at least some minimum temporal distance from the end of the PDCCH corresponding to the first PDSCH to the start of the second PDSCH.

As for the UE 12 decoding either a dynamic PDSCH or a configured PDSCH where the two PDSCHs overlap in time on a same DL carrier, in dependence on whether a timing relationship is satisfied between the ending time of the PDCCH scheduling the dynamic PDSCH and the starting time of the configured PDSCH, the UE 12 in one or more embodiments considers the timing relationship to be satisfied if the ending time of the PDCCH scheduling the dynamic PDSCH is before the starting time of the configured PDSCH.

In another example, the timing relationship is satisfied if the ending time of the PDCCH scheduling the dynamic PDSCH is at least N Orthogonal Frequency Division Multiplexing (OFDM) symbol times before the starting time of the configured PDSCH, wherein N is an integer. Here, the N OFDM symbol times are based on a minimum OFDM subcarrier spacing, as between a subcarrier spacing used for the configured PDSCH and a subcarrier spacing used for the PDCCH scheduling the dynamic PDSCH.

In another example, the timing relationship is satisfied if the ending time of the PDCCH scheduling the dynamic PDSCH is at least N symbol durations before the starting time of the configured PDSCH. Here, the symbol durations are defined by the smallest subcarrier spacing as between a subcarrier spacing associated with the configured PDSCH and a subcarrier spacing associated with the PDSCH scheduling the dynamic PDSCH.

In another example, the timing relationship is satisfied if the starting time of the configured PDSCH is at least a minimum temporal distance beyond the ending time of the PDCCH scheduling the dynamic PDSCH. The temporal distance may be measured or calculated by the UE 12 in terms of symbol durations, as explained above.

Thus, in one or more embodiments contemplated herein, a UE 12 is configured for operation in a wireless communication network and the UE 12 comprises communication circuitry configured to send communication signals to radio network nodes of the wireless communication network and to receive communication signals from radio network nodes of the wireless communication network. Further, the UE 12 comprises processing circuitry operatively associated with the communication circuitry and configured to decode a dynamic PDSCH that overlaps on a same DL carrier with a configured PDSCH, if a starting time of the configured PDSCH and an ending time of a PDCCH scheduling the dynamic PDSCH satisfies a timing relationship, and otherwise not decode the dynamic PDSCH.

Figure 8:
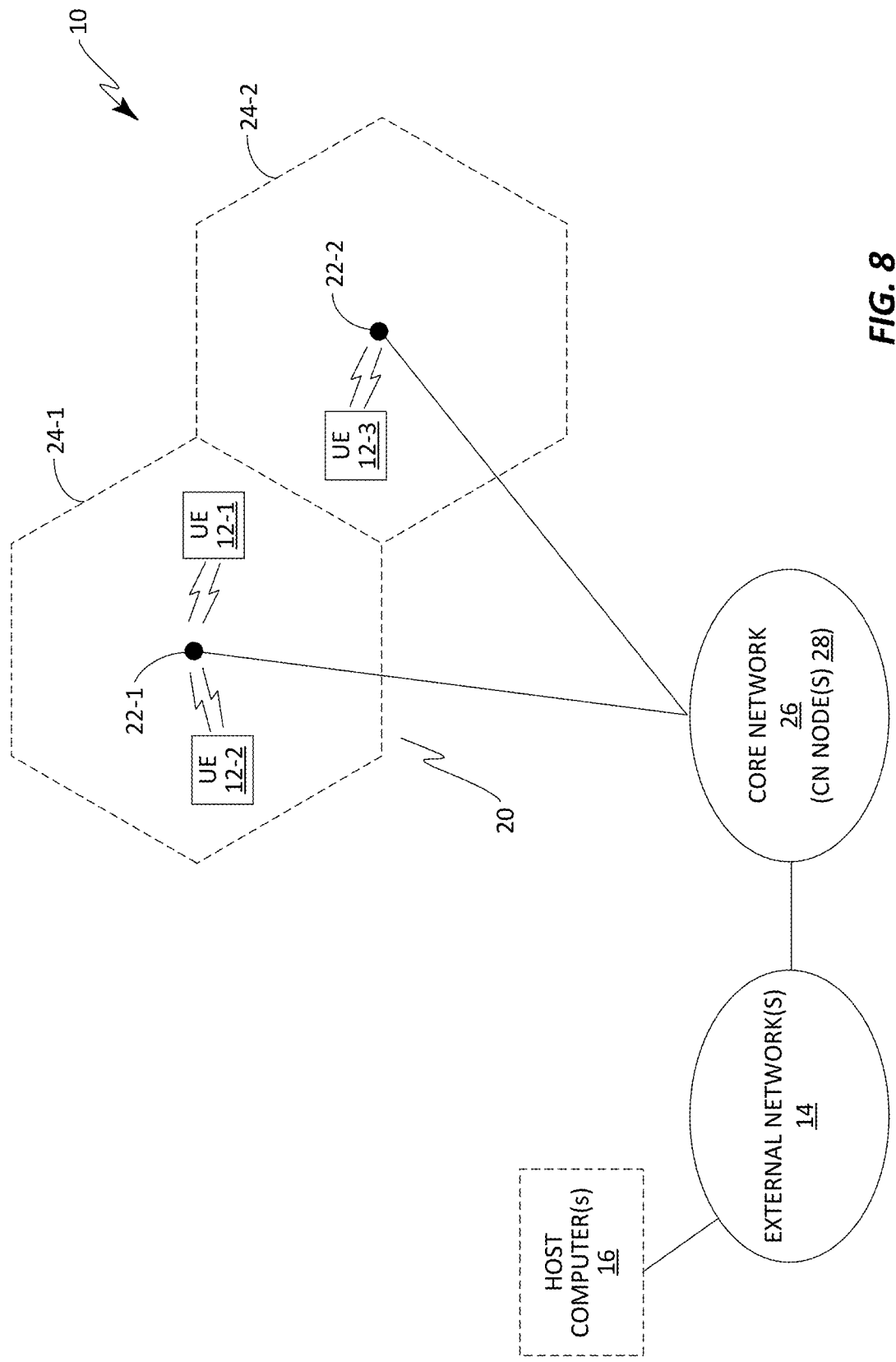
FIG. 8 is a block diagram of one embodiment of a wireless communication network.

Turning back to FIG. 8, the diagram also illustrates example implementation details for the radio network node 22. The example radio network node 22 includes communication circuitry 50 comprising receiver circuitry 52 and transmitter circuitry 54, along with processing circuitry 56, and storage 58. The storage 58 comprises one or more types of computer-readable media, such as one or more kinds of memory circuits or devices. Examples include any one or more of SRAM, DRAM, FLASH, EEPROM, Solid State Disk (SSD), and electromagnetic disk storage.

The processing circuitry 56 comprises one or more types of digital processing circuitry, such as one or more microprocessors, microcontrollers, Digital Signal Processors (DSPs), Field Programmable Gate Arrays (FPGAs), Application Specific Integrated Circuits (ASICs), or one or more Systems-on-a-Chip (SoC). Broadly, the processing circuitry 56 comprises fixed, non-programmable circuitry, or comprises programmed circuitry that is specially adapted to carry out the relevant preemption-related operations described herein for a radio network node 22 or comprises a mix of fixed and programmed circuitry.

In at least one such embodiment, the radio network node 22 includes one or more digital processing circuits, such as one or more microprocessors, that are configured as or operative as the illustrated processing circuitry 56, based on their execution of stored computer program instructions. To that end, the storage 58 in one or more embodiments stores one or more computer programs (CPs) 60, where "stores" here does not necessarily connote permanent or unchanging storage but does connote retention of at least some persistence, such as storage in working memory for program execution. The storage 58 in one or more embodiments also provides volatile and/or non-volatile storage for one or more items of configuration data (CFG. DATA) 62. Such data may be pre-provisioned in the radio network node 22 and/or obtained or generated dynamically during operation.

An example radio network node 22 configured for operation in a wireless communication network 10 comprises communication circuitry 50 configured for sending signals to and receiving signals from UEs 12. The communication circuitry 50 includes, for example, radio transceiver circuitry configured for radio-based communications in the network 10, such as a radiofrequency receiver 52 (or receivers) for receiving uplink signals from UEs 12, and a radiofrequency transmitter 54 (or transmitters) for transmitting downlink signals to UEs 12. The communication circuitry 50 further comprises interface circuitry, such as computer-data network interfaces or other interfaces configured to communicatively interconnect the radio network node 22 with the supporting or controlling nodes in the core network 26 (see FIG. 1) and with neighboring radio network nodes 22.

Further, the radio network node 22 comprises processing circuitry 56 that is operatively associated with the communication circuitry 50. Here, "operatively associated" means that the processing circuitry 56 sends and receives data and control signaling via the communication circuitry 50. For example, the processing circuitry 56 includes or is associated with baseband processing circuitry that implements a radio protocol stack used for receiving radio signals from a UE 12 via the communication circuitry 50 and recovering control signaling and data from the received signals, and for encoding and modulating outgoing control signaling and data, for transmission to UEs 12 via the communication circuitry 50.

With respect to a configured downlink transmission for a UE 12 and a dynamic downlink transmission for the UE 12, the processing circuitry 56 of the radio network node 22 is, in one or more embodiments, configured to adapt transmission and/or reception operations at the radio network node 22 with respect to the UE 12, based on an expected or known behavior by the UE 12. For example, the radio network node 22 knows that the UE 12 will decode the configured downlink transmission and not the dynamic downlink transmission and a dynamic assignment associated therewith, responsive to the dynamic assignment at least partially overlapping in time with the configured downlink transmission, and knows that the UE 12 will decode the dynamic downlink transmission and not the configured downlink transmission, responsive to the dynamic assignment timewise ending before the configured downlink transmission began, at least in a case where the dynamic downlink transmission at least partially overlaps the configured downlink transmission in time.

In the same embodiment(s) of the radio network node 22, or in another embodiment of the radio network node 22, the processing circuitry 56 is configured to control the timing of a dynamic assignment in relation to a configured downlink transmission, so that the targeted UE 12 follows a desired behavior. For example, consider a configured downlink transmission for a UE 12 and a dynamic downlink transmission for the UE 12 in the same slot or other applicable interval. Assume that the UE 12 is configured to process the dynamic downlink transmission rather than the configured downlink transmission, if the transmission of the dynamic assignment (e.g., PUCCH) does not overlap timewise with the transmission of the configured downlink transmission. Correspondingly, the radio network node 22 may ensure that the dynamic assignment is transmitted, to ensure that the UE follows the dynamic downlink transmission—i.e., so that the UE 12 overrides the configured downlink transmission.

FIG. 12 illustrates another example embodiment of the radio network node, where the radio network node 22 comprises a set 64 of processing modules or functional units 66, such as may be realized or instantiated via the execution of computer program instructions via one or more processors or other type(s) of digital processing circuitry. The radio network node 22 of FIG. 12 may be configured to carry out any of the processing operations described herein for a radio network node.

Figure 13:
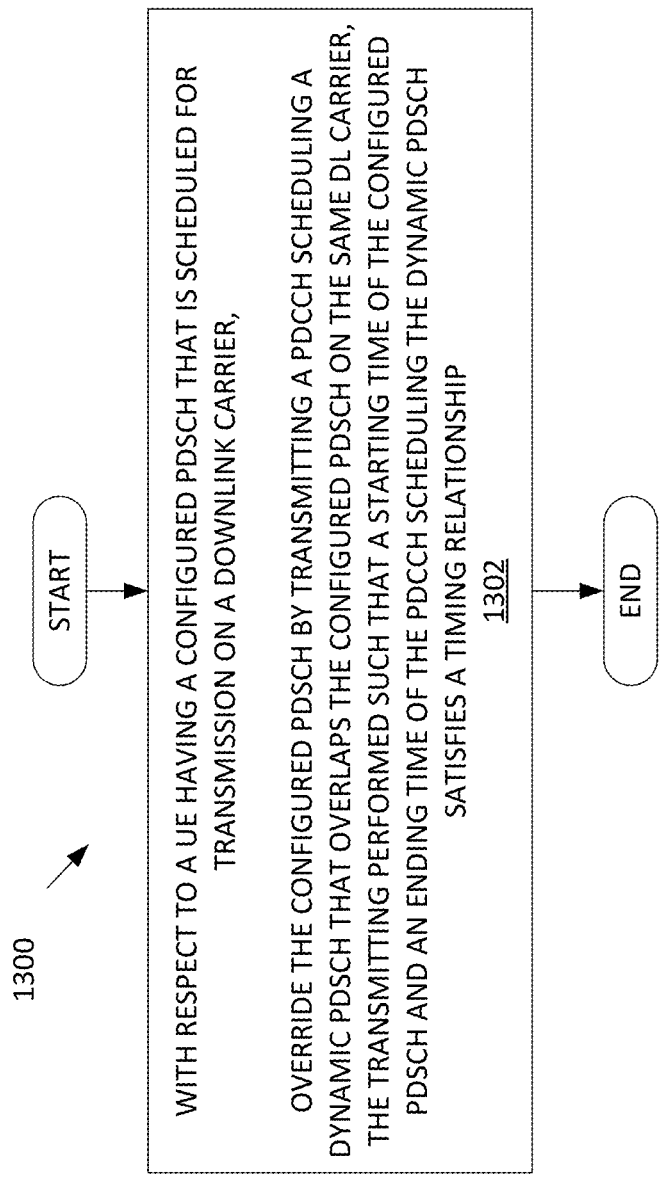
FIG. 13 is a logic flow diagram of one embodiment of a method of operation by a radio network node.

FIG. 13 illustrates a method 1300 of operation performed by a radio network node 22 in one or more embodiments herein. With respect to a UE 12 having a configured PDSCH that is scheduled for transmission on a downlink carrier, the method 1300 comprises the radio network node 22 overriding (1302) the configured PDSCH by transmitting a PDCCH scheduling a dynamic PDSCH that overlaps the configured PDSCH on the same DL carrier, the transmitting performed such that a starting time of the configured PDSCH and an ending time of the PDCCH scheduling the dynamic PDSCH satisfies a timing relationship.

In the same or another embodiment, with respect to a configured downlink transmission and a dynamic downlink transmission (both in the same slot or time interval and both involving the same UE 12), a radio network node 22 according to one or more embodiments herein adapts its reception and/or processing operations to account for the known or expected behavior of the UE 12 with respect to the two downlink transmissions being in the same slot or interval. For example, the UE 12 behaves according to any of the UE embodiments described herein, and the radio network node 22 controls one or more of its operations associated with monitoring for or receiving signals from the UE 12 and/or scheduling and or transmitting with respect to the UE 12. In at least one embodiment, the radio network node 22 is configured to control the transmission timing of the dynamic assignment that schedules the dynamic downlink transmission, so that the UE 12 prioritizes the dynamic downlink transmission over the configured downlink transmission.

As a particular example, a radio network node 22 comprises communication circuitry configured to communicate with a UE 12 and processing circuitry that is operatively associated with the communication circuitry. The processing circuitry is configured to override a configured PDSCH by transmitting a PDCCH scheduling a dynamic PDSCH that overlaps the configured PDSCH on the same DL carrier, the transmitting performed such that a starting time of the configured PDSCH and an ending time of the PDCCH scheduling the PDSCH satisfies a timing relationship. Such operations may be undertaken by the radio network node 22 with respect to any configured PDSCH—e.g., with respect to any of the one or more PDSCHs granted to the UE 12 on a semi-persistent basis.

The timing relationship is satisfied, for example, if the ending time of the PDCCH scheduling the dynamic PDSCH is at least N symbol durations before the starting time of the configured PDSCH. Here, the symbol durations are defined by the smallest subcarrier spacing as between a subcarrier spacing associated with the configured PDSCH and a subcarrier spacing associated with the PDSCH scheduling the dynamic PDSCH.

Figure 14:
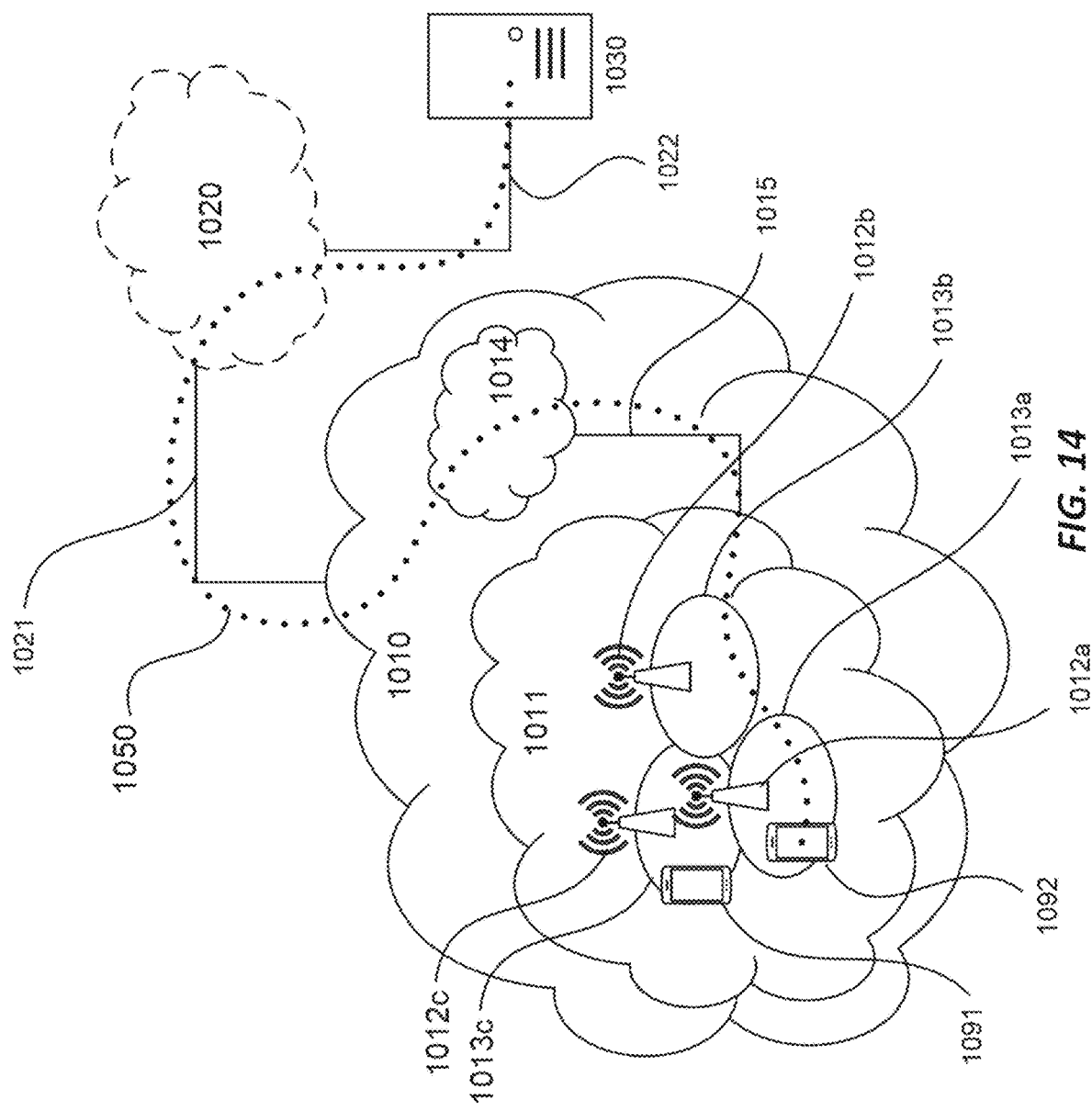
FIG. 14 is a block diagram of a communication network according to another embodiment.

As for further extensions and variations of the network-node and UE operations contemplated herein, FIG. 14 depicts an example communication system which includes telecommunication network 1010, such as a 3GPP-type cellular network, which comprises access network 1011, such as a radio access network, and a core network 1014. Access network 1011 comprises a plurality of base stations 1012a, 1012b, 1012c, e.g. operating as radio network nodes 22, such as NBs, eNBs, gNBs or other types of wireless access points, each defining a corresponding coverage area 1013a, 1013b, 1013c. Each base station 1012a, 1012b, 1012c is connectable to core network 1014 over a wired or wireless connection 1015. A first UE 1091, e.g., operating as a previously described UE 12, located in coverage area 1013c is configured to wirelessly connect to, or be paged by, the corresponding base station 1012c. A second UE 1092 in coverage area 1013a is wirelessly connectable to the corresponding base station 1012a. While a plurality of UEs 1091, 1092 are illustrated in this example, the disclosed embodiments are equally applicable to a situation where a sole UE is in the coverage area or where a sole UE is connecting to the corresponding base station 1012. All such UEs may operate as described for a UE 12 herein.

Telecommunication network 1010 is itself connected to host computer 1030, which may be embodied in the hardware and/or software of a standalone server, a cloud-implemented server, a distributed server or as processing resources in a server farm. Host computer 1030 may be under the ownership or control of a service provider or may be operated by the service provider or on behalf of the service provider. Connections 1021 and 1022 between telecommunication network 1010 and host computer 1030 may extend directly from core network 1014 to host computer 1030 or may go via an optional intermediate network 1020. Intermediate network 1020 may be one of, or a combination of more than one of, a public, private, or hosted network; intermediate network 1020, if any, may be a backbone network or the Internet; in particular, intermediate network 1020 may comprise two or more sub-networks (not shown).

The communication system of FIG. 14 as a whole enables connectivity between the connected UEs 1091, 1092 and host computer 1030. The connectivity may be described as an over-the-top (OTT) connection 1050. Host computer 1030 and the connected UEs 1091, 1092 are configured to communicate data and/or signaling via OTT connection 1050, using access network 1011, core network 1014, any intermediate network 1020 and possible further infrastructure (not shown) as intermediaries. OTT connection 1050 may be transparent in the sense that the participating communication devices through which OTT connection 1050 passes are unaware of routing of uplink (UL) and downlink (DL) communications. For example, base station 1012 may not or need not be informed about the past routing of an incoming downlink communication with data originating from host computer 1030 to be forwarded (e.g., handed over) to a connected UE 1091. Similarly, base station 1012 need not be aware of the future routing of an outgoing uplink communication originating from the UE 1091 towards the host computer 1030.

Example implementations, in accordance with an embodiment, of the UE, base station and host computer discussed in the preceding paragraphs will now be described with reference to FIG. 15. In communication system 1100, host computer 1110 comprises hardware 1115 including communication interface 1116 configured to set up and maintain a wired or wireless connection with an interface of a different communication device of communication system 1100. Host computer 1110 further comprises processing circuitry 1118, which may have storage and/or processing capabilities. Processing circuitry 1118 may comprise one or more programmable processors, application-specific integrated circuits, field programmable gate arrays or combinations of these (not shown) adapted to execute instructions. Host computer 1110 further comprises software 1111, which is stored in or accessible by host computer 1110 and executable by processing circuitry 1118. Software 1111 includes host application 1112. Host application 1112 may be operable to provide a service to a remote user, such as UE 1130 connecting via OTT connection 1150 terminating at UE 1130 and host computer 1110. In providing the service to the remote user, host application 1112 may provide user data which is transmitted using OTT connection 1150.

Communication system 1100 further includes base station 1120 provided in a telecommunication system and comprising hardware 1125 enabling it to communicate with host computer 1110 and with UE 1130. Hardware 1125 may include communication interface 1126 for setting up and maintaining a wired or wireless connection with an interface of a different communication device of communication system 1100, as well as radio interface 1127 for setting up and maintaining at least wireless connection 1170 with UE 1130 located in a coverage area served by base station 1120. Communication interface 1126 may be configured to facilitate connection 1160 to host computer 1110. Connection 1160 may be direct, or it may pass through a core network of the telecommunication system and/or through one or more intermediate networks outside the telecommunication system. In the embodiment shown, hardware 1125 of base station 1120 further includes processing circuitry 1128, which may comprise one or more programmable processors, application-specific integrated circuits, field programmable gate arrays or combinations of these (not shown) adapted to execute instructions. Base station 1120 further has software 1121 stored internally or accessible via an external connection.

Communication system 1100 further includes UE 1130 already referred to above, and its hardware 1135 may include radio interface 1137 configured to set up and maintain wireless connection 1170 with a base station serving a coverage area in which UE 1130 is currently located. Hardware 1135 of UE 1130 further includes processing circuitry 1138, which may comprise one or more programmable processors, application-specific integrated circuits, field programmable gate arrays or combinations of these (not shown)

adapted to execute instructions. UE 1130 further comprises software 1131, which is stored in or accessible by UE 1130 and executable by processing circuitry 1138. Software 1131 includes client application 1132. Client application 1132 may be operable to provide a service to a human or non-human user via UE 1130, with the support of host computer 1110. In host computer 1110, an executing host application 1112 may communicate with the executing client application 1132 via OTT connection 1150 terminating at UE 1130 and host computer 1110. In providing the service to the user, client application 1132 may receive request data from host application 1112 and provide user data in response to the request data. OTT connection 1150 may transfer both the request data and the user data. Client application 1132 may interact with the user to generate the user data that it provides.

Figure 15:
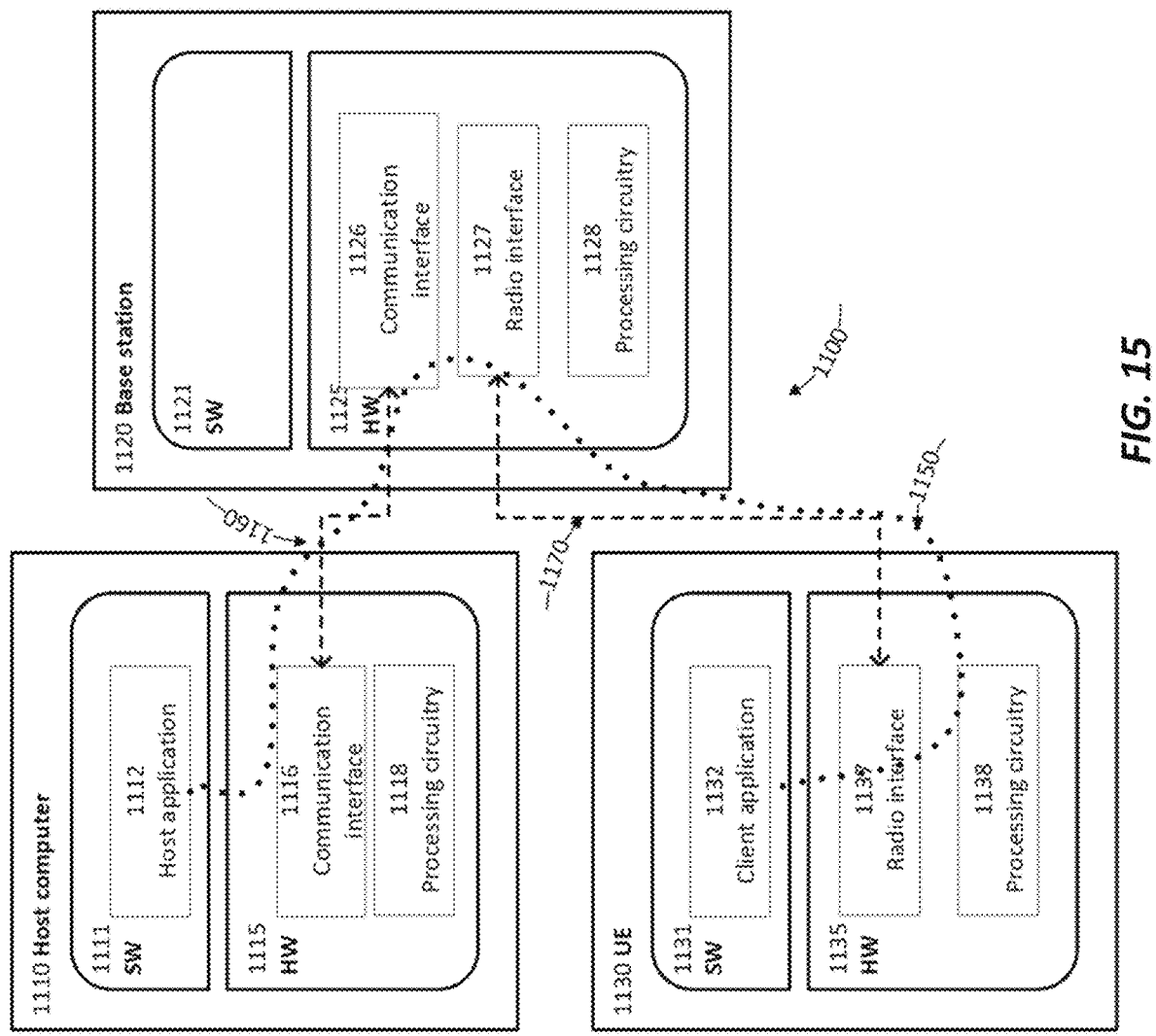
FIG. 15 is a block diagram of example implementation details for a UE, a base station, and a host computer, such as seen in FIG. 14.

It is noted that host computer 1110, base station 1120 and UE 1130 illustrated in FIG. 15 may be similar or identical to host computer 1030, one of base stations 1012*a*, 1012*b*, 1012*c* and one of UEs 1091, 1092 of FIG. 14, respectively. This is to say, the inner workings of these entities may be as shown in FIG. 15 and independently, the surrounding network topology may be that of FIG. 14.

In FIG. 15, OTT connection 1150 has been drawn abstractly to illustrate the communication between host computer 1110 and UE 1130 via base station 1120, without explicit reference to any intermediary devices and the precise routing of messages via these devices. Network infrastructure may determine the routing, which it may be configured to hide from UE 1130 or from the service provider operating host computer 1110, or both. While OTT connection 1150 is active, the network infrastructure may further take decisions by which it dynamically changes the routing (e.g., based on load balancing consideration or reconfiguration of the network).

Wireless connection 1170 between UE 1130 and base station 1120 is in accordance with the teachings of the embodiments described throughout this disclosure. One or more of the various embodiments improve the performance of OTT services provided to UE 1130 using OTT connection 1150, in which wireless connection 1170 forms the last segment. More precisely, the teachings of these embodiments may reduce the RA latency and thereby provide benefits such as improved performance of the communications network, in particular when transmitting infrequent small data packets.

A measurement procedure may be provided for the purpose of monitoring data rate, latency, and other factors on which the one or more embodiments improve. There may further be an optional network functionality for reconfiguring OTT connection 1150 between host computer 1110 and UE 1130, in response to variations in the measurement results. The measurement procedure and/or the network functionality for reconfiguring OTT connection 1150 may be implemented in software 1111 and hardware 1115 of host computer 1110 or in software 1131 and hardware 1135 of UE 1130, or both. In embodiments, sensors (not shown) may be deployed in or in association with communication devices through which OTT connection 1150 passes; the sensors may participate in the measurement procedure by supplying values of the monitored quantities exemplified above or supplying values of other physical quantities from which software 1111, 1131 may compute or estimate the monitored quantities. The reconfiguring of OTT connection 1150 may include message format, retransmission settings, preferred routing etc.; the reconfiguring need not affect base station 1120, and it may be unknown or imperceptible to base station 1120. Such procedures and functionalities may be known and practiced in the art. In certain embodiments, measurements may involve proprietary UE signaling facilitating host computer 1110's measurements of throughput, propagation times, latency, and the like. The measurements may be implemented in that software 1111 and 1131 causes messages to be transmitted, in particular empty or 'dummy' messages, using OTT connection 1150 while it monitors propagation times, errors etc.

FIG. 16 is a flowchart illustrating a method 1200 implemented in a communication system, in accordance with one embodiment. The communication system includes a host computer, a base station and a UE which may be those described with reference to FIGS. 14 and 15. For simplicity of the present disclosure, only drawing references to FIG. 16 will be included in this section. In step 1210, the host computer provides user data. In sub step 1211 (which may be optional) of step 1210, the host computer provides the user data by executing a host application. In step 1220, the host computer initiates a transmission carrying the user data to the UE. In step 1230 (which may be optional), the base station transmits to the UE the user data which was carried in the transmission that the host computer initiated, in accordance with the teachings of the embodiments described throughout this disclosure. In step 1240 (which may also be optional), the UE executes a client application associated with the host application executed by the host computer.

FIG. 17 is a flowchart illustrating a method 1300 implemented in a communication system, in accordance with one embodiment. The communication system includes a host computer, a base station and a UE which may be those described with reference to FIGS. 14 and 15. For simplicity of the present disclosure, only drawing references to FIG. 17 will be included in this section. In step 1310 of the method 1300, the host computer provides user data. In an optional sub step (not shown) the host computer provides the user data by executing a host application. In step 1320, the host computer initiates a transmission carrying the user data to the UE. The transmission may pass via the base station, in accordance with the teachings of the embodiments described throughout this disclosure. In step 1330 (which may be optional), the UE receives the user data carried in the transmission.

FIG. 18 is a flowchart illustrating a method 1400 implemented in a communication system, in accordance with one embodiment. The communication system includes a host computer, a base station and a UE which may be those described with reference to FIGS. 14 and 15. For simplicity of the present disclosure, only drawing references to FIG. 18 will be included in this section. In step 1410 (which may be optional), the UE receives input data provided by the host computer. Additionally, or alternatively, in step 1420, the UE provides user data. In sub step 1421 (which may be optional) of step 1420, the UE provides the user data by executing a client application. In sub step 1411 (which may be optional) of step 1410, the UE executes a client application which provides the user data in reaction to the received input data provided by the host computer. In providing the user data, the executed client application may further consider user input received from the user. Regardless of the specific way the user data was provided, the UE initiates, in sub step 1430 (which may be optional), transmission of the user data to the host computer. In step 1440 of the method 1400, the host computer receives the user data transmitted from the UE, in accordance with the teachings of the embodiments described throughout this disclosure.

FIG. 19 is a flowchart illustrating a method 1500 implemented in a communication system, in accordance with one embodiment. The communication system includes a host computer, a base station and a UE which may be those described with reference to FIGS. 14 and 15. For simplicity of the present disclosure, only drawing references to FIG. 19 will be included in this section. In step 1510 (which may be optional), in accordance with the teachings of the embodiments described throughout this disclosure, the base station receives user data from the UE. In step 1520 (which may be optional), the base station initiates transmission of the received user data to the host computer. In step 1530 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according to one or more embodiments of the present disclosure.

EXAMPLE EMBODIMENTS

Group A Embodiments

1. A method in a UE of decoding a PDSCH, the method comprising
acquiring configuration information related to semi-persistent scheduling for downlink,
receiving a configured downlink assignment for this Serving Cell to start in an associated PDSCH duration and to recur according to a set of rules;
selecting a PDSCH from a first PDSCH and a second PDSCH that have an overlapping PDSCH duration, wherein the first PDSCH is based on the configured downlink assignment and the second PDSCH is based on a downlink assignment received in a PDCCH, wherein the selection is based on a timing relationship between the start of the first PDSCH and an ending time of the PDCCH scheduling the second PDSCH; and
decoding the selected PDSCH.

2. The method of embodiment 1, second PDSCH is selected if the corresponding PDCCH scheduling the dynamically assigned PDSCH ends before the start of the first PDSCH.

3. The method of embodiment 1, the first PDSCH is selected if the PDCCH scheduling the second PDSCH ends after the beginning of the first PDSCH.

4. The method of embodiment 1, where the end of PDCCH is N OFDM symbols before start of the first PDSCH.

5. The method of embodiment 1, where end of PDCCH is Tproc,1 before the start of the first PDSCH.

6. The method of embodiment 1, where the end of PDCCH is X slots before the slot corresponding to the start of the first PDSCH.

7. A method in a UE, the method comprising:
acquiring configuration information related to semi-persistent scheduling for downlink for a serving cell;
receiving a configured downlink assignment for the serving cell to start in the associated PDSCH duration and to recur according to a set of rules;
receive, in a PDSCH duration, a transport block on the DL-SCH according to the configured downlink assignment wherein the reception is based on the following condition being satisfied: if the PDSCH duration of the configured downlink assignment does not overlap with the PDSCH duration of a downlink assignment received on the PDCCH for the serving cell and the PDCCH for the serving cell is received in a PDCCH occasion that ends before the start of the PDSCH duration of the configured downlink assignment.

8. The method of embodiment 7, where the end is N OFDM symbols before start of the PDSCH duration.

9. The method of embodiment 7, where end is Tproc,1 before the start of the PDSCH duration.

10. The method of embodiment 7, where the end is X slots before the slot corresponding to the start of the PDSCH duration.

11. A method performed by a User Equipment (UE) configured for operation in a wireless communication network, the method comprising:
with respect to a dynamic downlink transmission for the UE and a configured downlink transmission for the UE that are within a same slot, determining how to prioritize or handle the two transmission in dependence a timing of a control message that schedules the dynamic downlink transmission in relation to a timing of the configured downlink transmission.

12. A User Equipment (UE) configured for operation in a wireless communication network, and comprising:
communication circuitry configured to send communication signals to radio network nodes of the wireless communication network and to receive communication signals from radio network nodes of the wireless communication network; and
processing circuitry operatively associated with the communication circuitry and configured to carry out operations implementing any of the methods of embodiments 1-11.

13. A method performed by a User Equipment (UE) configured for operation in a wireless communication network, the method comprising:
with respect to a configured downlink transmission and a dynamic downlink transmission,
decoding the configured downlink transmission and not the dynamic downlink transmission and a dynamic assignment associated therewith, responsive to the dynamic assignment at least partially overlapping in time with the configured downlink transmission; and
decoding the dynamic downlink transmission and not the configured downlink transmission, responsive to the dynamic assignment timewise ending before the configured downlink transmission began, at least in a case where the dynamic downlink transmission at least partially overlaps the configured downlink transmission in time.

14. The method of embodiment 13, wherein decoding the dynamic downlink transmission and not the configured downlink transmission, responsive to the dynamic assignment timewise ending before the configured downlink transmission began, at least in the case where the dynamic downlink transmission at least partially overlaps the configured downlink transmission in time, comprises:

decoding the dynamic downlink transmission and not the configured downlink transmission, in the case where the dynamic downlink transmission at least partially overlaps the configured downlink transmission in time; and decoding both the dynamic downlink transmission and the configured downlink transmission, in a case where the dynamic downlink transmission does not overlap the configured downlink transmission.

15. The method of embodiment 13 or 14, wherein the UE includes a reception buffer for holding signal samples representing received signals, and wherein the UE buffers signal samples corresponding to any one or more of the configured downlink transmission, the dynamic downlink transmission, and the dynamic assignment, and wherein decoding and/or other processing by the UE may comprise processing buffered signal samples.

16. A User Equipment (UE) configured for operation in a wireless communication network, and comprising:

communication circuitry configured to send communication signals to radio network nodes of the wireless communication network and to receive communication signals from radio network nodes of the wireless communication network; and processing circuitry operatively associated with the communication circuitry and configured to carry out operations implementing any of the methods of embodiments 13-15.

Group B Embodiments

17. A method performed by a radio network node configured for operation in a wireless communication network, the method comprising:

with respect to a configured downlink transmission for a UE and a dynamic downlink transmission for the UE, adapting transmission and/or reception operations at the radio network node with respect to the UE, based on an expected or known behavior by the UE, in which the UE decodes the configured downlink transmission and not the dynamic downlink transmission and a dynamic assignment associated therewith, responsive to the dynamic assignment at least partially overlapping in time with the configured downlink transmission, and decodes the dynamic downlink transmission and not the configured downlink transmission, responsive to the dynamic assignment timewise ending before the configured downlink transmission began, at least in a case where the dynamic downlink transmission at least partially overlaps the configured downlink transmission in time.

18. A radio network node configured for operation in a wireless communication network, the radio network node comprising:

communication circuitry configured to send communication signals to User Equipments (UEs) and to receive communication signals from UEs; and processing circuitry operative associated with the communication circuitry and configured to:

with respect to a configured downlink transmission for a UE and a dynamic downlink transmission for the UE, adapt transmission and/or reception operations at the radio network node with respect to the UE, based on an expected or known behavior by the UE, in which the UE decodes the configured downlink transmission and not the dynamic downlink transmission and a dynamic assignment associated therewith, responsive to the dynamic assignment at least partially overlapping in time with the configured downlink transmission, and decodes the dynamic downlink transmission and not the configured downlink transmission, responsive to the dynamic assignment timewise ending before the configured downlink transmission began, at least in a case where the dynamic downlink transmission at least partially overlaps the configured downlink transmission in time.

In the same embodiments of a radio network node, or in another embodiment of a radio network node, the radio network is configured to control the timing of a dynamic assignment in relation to a configured downlink transmission, so that the targeted UE follows a desired behavior. For example, consider a configured downlink transmission for a UE and a dynamic downlink transmission for the UE in the same slot or other applicable interval. Assume that the UE is configured to process the dynamic downlink transmission rather than the configured downlink transmission, if the transmission of the dynamic assignment (e.g., PUCCH) does not overlap timewise with the transmission of the configured downlink transmission. Correspondingly, the radio network node may ensure that the dynamic assignment is transmitted to ensure that the UE follows the dynamic downlink transmission—i.e., overrides the configured downlink transmission.

Group C Embodiments

19. A communication system including a host computer comprising:

processing circuitry configured to provide user data; and
   a communication interface configured to forward the user data to a cellular network for transmission to a user equipment (UE),
   wherein the cellular network comprises a base station or other type of radio network node having a radio interface and processing circuitry, the base station's processing circuitry configured to perform any of the steps of any of the Group B embodiments.

20. The communication system of the previous embodiment further including the radio network node station.

21. The communication system of the previous 2 embodiments, further including the UE, wherein the UE is configured to communicate with the radio network node.

22. The communication system of the previous 3 embodiments, wherein:

the processing circuitry of the host computer is configured to execute a host application, thereby providing the user data; and
   the UE comprises processing circuitry configured to execute a client application associated with the host application.

23. A method implemented in a communication system including a host computer, a base station or other type of radio network node, and a user equipment (UE), the method comprising:

at the host computer, providing user data; and
at the host computer, initiating a transmission carrying the user data to the UE via a cellular network comprising the radio network node, wherein the radio network node performs any of the steps of any of the Group B embodiments.

24. The method of the previous embodiment, further comprising, at the radio network node, transmitting the user data.

25. The method of the previous 2 embodiments, wherein the user data is provided at the host computer by executing a host application, the method further comprising, at the UE, executing a client application associated with the host application.

26. A user equipment (UE) configured to communicate with a base station or other radio network node, the UE comprising a radio interface and processing circuitry configured to perform any of the previous 3 embodiments.

27. A communication system including a host computer comprising:
  processing circuitry configured to provide user data; and
  a communication interface configured to forward user data to a cellular network for transmission to a user equipment (UE),
  wherein the UE comprises a radio interface and processing circuitry, the UE's components configured to perform any of the steps of any of the Group A embodiments.

28. The communication system of the previous embodiment, wherein the cellular network further includes a base station or other radio network node configured to communicate with the UE.

29. The communication system of the previous 2 embodiments, wherein:
  the processing circuitry of the host computer is configured to execute a host application, thereby providing the user data; and
  the UE's processing circuitry is configured to execute a client application associated with the host application.

30. A method implemented in a communication system including a host computer, a base station or other type of radio network node and a user equipment (UE), the method comprising:
  at the host computer, providing user data; and
  at the host computer, initiating a transmission carrying the user data to the UE via a cellular network comprising the radio network node, wherein the UE performs any of the steps of any of the Group A embodiments.

31. The method of the previous embodiment, further comprising at the UE, receiving the user data from the radio network node.

32. A communication system including a host computer comprising:
  communication interface configured to receive user data originating from a transmission from a user equipment (UE) to a base station or other type of radio network node,
  wherein the UE comprises a radio interface and processing circuitry, the UE's processing circuitry configured to perform any of the steps of any of the Group A embodiments.

33. The communication system of the previous embodiment, further including the UE.

34. The communication system of the previous 2 embodiments, further including the radio network node, wherein the radio network node comprises a radio interface configured to communicate with the UE and a communication interface configured to forward to the host computer the user data carried by a transmission from the UE to the radio network node.

35. The communication system of the previous 3 embodiments, wherein:
  the processing circuitry of the host computer is configured to execute a host application; and
  the UE's processing circuitry is configured to execute a client application associated with the host application, thereby providing the user data.

36. The communication system of the previous 4 embodiments, wherein:
  the processing circuitry of the host computer is configured to execute a host application, thereby providing requested data; and
  the UE's processing circuitry is configured to execute a client application associated with the host application, thereby providing the user data in response to the requested data.

37. A method implemented in a communication system including a host computer, a base station or other type of radio network node, and a user equipment (UE), the method comprising:
  at the host computer, receiving user data transmitted to the radio network node from the UE, wherein the UE performs any of the steps of any of the Group A embodiments.

38. The method of the previous embodiment, further comprising, at the UE, providing the user data to the radio network node.

39. The method of the previous 2 embodiments, further comprising:
  at the UE, executing a client application, thereby providing the user data to be transmitted; and
  at the host computer, executing a host application associated with the client application.

40. The method of the previous 3 embodiments, further comprising:
  at the UE, executing a client application; and
  at the UE, receiving input data to the client application, the input data being provided at the host computer by executing a host application associated with the client application,
  wherein the user data to be transmitted is provided by the client application in response to the input data.

41. A communication system including a host computer comprising a communication interface configured to receive user data originating from a transmission from a user equipment (UE) to a base station or other type of radio network node, wherein the radio network node comprises a radio interface and processing circuitry, the radio network node's processing circuitry configured to perform any of the steps of any of the Group B embodiments.

42. The communication system of the previous embodiment further including the radio network node.

43. The communication system of the previous 2 embodiments, further including the UE, wherein the UE is configured to communicate with the radio network node.

44. The communication system of the previous 3 embodiments, wherein:
  the processing circuitry of the host computer is configured to execute a host application;
  the UE is configured to execute a client application associated with the host application, thereby providing the user data to be received by the host computer.

45. A method implemented in a communication system including a host computer, a base station or other type of radio network node, and a user equipment (UE), the method comprising:
- at the host computer, receiving, from the radio network node, user data originating from a transmission which the radio network node has received from the UE, wherein the UE performs any of the steps of any of the Group A embodiments.

46. The method of the previous embodiment, further comprising at the radio network node, receiving the user data from the UE.

47. The method of the previous 2 embodiments, further comprising at the radio network node, initiating a transmission of the received user data to the host computer.

Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

What is claimed is:

1. A method performed by a User Equipment (UE) operating in a wireless communication network, the method comprising:
- with respect to a dynamically scheduled Physical Downlink Shared Channel (PDSCH) that overlaps in time on a same Downlink (DL) carrier with a semi persistently scheduled PDSCH, decoding the dynamically scheduled PDSCH responsive to a starting time of the semi-persistently scheduled PDSCH and an ending time of a Physical Downlink Control Channel (PDCCH) scheduling the dynamically scheduled PDSCH satisfying a timing relationship;
- wherein the timing relationship is the ending time of the PDCCH scheduling the dynamically scheduled PDSCH being at least fourteen Orthogonal Frequency Division Multiplexing (OFDM) symbol times before the starting time of the semi-persistently scheduled PDSCH.

2. The method of claim 1, further comprising the UE receiving signaling from a network node of the wireless communication network, the signaling indicating semi-persistent resources assigned to the UE for reception of the semi-persistently scheduled PDSCH.

3. The method of claim 1, wherein the fourteen OFDM symbol times is based on a minimum OFDM subcarrier spacing, as between a subcarrier spacing used for the semi-persistently scheduled PDSCH and a subcarrier spacing used for the PDCCH scheduling the dynamically scheduled PDSCH.

4. A User Equipment (UE) configured for operation in a wireless communication network, and comprising:
- communication circuitry configured to send communication signals to radio network nodes of the wireless communication network and to receive communication signals from radio network nodes of the wireless communication network; and
- processing circuitry operatively associated with the communication circuitry and wherein, with respect to a dynamically scheduled Physical Downlink Shared Channel (PDSCH) that overlaps in time on a same Downlink (DL) carrier with a semi-persistently scheduled PDSCH, the processing circuitry is configured to decode the dynamically scheduled PDSCH if a starting time of the semi-persistently scheduled PDSCH and an ending time of a Physical Downlink Control Channel (PDCCH) scheduling the dynamically scheduled PDSCH satisfies a timing relationship;
- wherein the timing relationship is the ending time of the PDCCH scheduling the dynamically scheduled PDSCH being at least fourteen Orthogonal Frequency Division Multiplexing (OFDM) symbol times before the starting time of the semi-persistently scheduled PDSCH.

5. The UE of claim 4, wherein the processing circuitry is configured to receive signaling from a network node of the wireless communication network, the signaling indicating semi-persistent resources assigned to the UE for reception of the semi-persistently scheduled PDSCH.

6. The UE of claim 4, wherein the fourteen OFDM symbol times is based on a minimum OFDM subcarrier spacing, as between a subcarrier spacing used for the semi-persistently scheduled PDSCH and a subcarrier spacing used for the PDCCH scheduling the dynamically scheduled PDSCH.

* * * * *